United States Patent
Jung et al.

(10) Patent No.: US 10,701,532 B2
(45) Date of Patent: Jun. 30, 2020

(54) SYSTEM AND METHOD OF PROVIDING SENSING DATA TO AN ELECTRONIC DEVICE USING A TEMPLATE TO IDENTIFY A DATA TYPE AND FORMAT FOR THE ELECTRONIC DEVICE

(71) Applicant: Samsung Electronics Co., Ltd., Suwon-si, Gyeonggi-do (KR)

(72) Inventors: Ho-yong Jung, Busan (KR); Jong-won Kim, Seoul (KR); Hong-uk Woo, Seoul (KR); Sang-woo Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 15/885,136

(22) Filed: Jan. 31, 2018

(65) Prior Publication Data
US 2018/0220279 A1     Aug. 2, 2018

(30) Foreign Application Priority Data
Feb. 2, 2017   (KR) .......................... 10-2017-0015133

(51) Int. Cl.
*H04W 4/38*       (2018.01)
*G06F 9/54*       (2006.01)
(Continued)

(52) U.S. Cl.
CPC .............. *H04W 4/38* (2018.02); *G06F 9/546* (2013.01); *H04L 12/2823* (2013.01);
(Continued)

(58) Field of Classification Search
CPC ...... H04W 4/38; H04W 4/70; H04L 12/4625; H04L 12/2823; H04L 2012/2841; H04L 69/08; H04L 67/12; G06F 9/546
See application file for complete search history.

(56) References Cited

U.S. PATENT DOCUMENTS 6,421,354 B1 *  7/2002  Godlewski ............. G08C 17/00
                                                  340/870.01
6,535,110 B1 *  3/2003  Arora ................... H04L 12/2803
                                                  340/12.32
(Continued)

FOREIGN PATENT DOCUMENTS

WO       2016/191133 A1    12/2016

OTHER PUBLICATIONS

European Search Report dated Aug. 6, 2019; European Appln. No. 18747452.3-1213 / 3516854 PCT/KR2018001423.

*Primary Examiner* — Daniel C. Murray
(74) *Attorney, Agent, or Firm* — Jefferson IP Law, LLP

(57) ABSTRACT

A server for and a method of providing sensing data to at least one electronic device is provided. The server includes a communication interface, a memory, and at least one processor, wherein the processor receives, from a first electronic device, a first template including information about a type of sensing data required by the first electronic device and a format of the sensing data and a request for the sensing data. The processor then selects the requested sensing data from among pieces of sensing data received from at least one second electronic device, based on the received first template, in response to the request, converts the selected sensing data, based on the first template, to obtain converted sensing data, and provides a response message including the converted sensing data to the first electronic device.

18 Claims, 13 Drawing Sheets

(51) Int. Cl.
  *H04L 12/28* (2006.01)
  *H04L 29/08* (2006.01)
  *H04L 29/06* (2006.01)
  *H04L 12/46* (2006.01)
  *H04W 4/70* (2018.01)

(52) U.S. Cl.
  CPC .......... *H04L 12/4625* (2013.01); *H04L 67/12* (2013.01); *H04L 69/08* (2013.01); *H04L 2012/2841* (2013.01); *H04W 4/70* (2018.02)

(56) References Cited

U.S. PATENT DOCUMENTS

| | | | | |
|---|---|---|---|---|
| 6,553,336 | B1* | 4/2003 | Johnson | G01D 3/022 702/188 |
| 8,145,767 | B2* | 3/2012 | Ishida | H04L 12/2838 709/227 |
| 8,150,952 | B2* | 4/2012 | Masuda | G06F 9/542 340/540 |
| 9,037,667 | B2 | 5/2015 | Rivkin | |
| 10,091,278 | B1* | 10/2018 | Garlapati | H04W 4/70 |
| 10,567,513 | B2* | 2/2020 | Kurihara | H04L 67/12 |
| 2005/0086264 | A1* | 4/2005 | Masuda | G06F 9/542 |
| 2006/0253598 | A1* | 11/2006 | Nakamura | H04L 12/2803 709/230 |
| 2007/0097878 | A1* | 5/2007 | Morioka | H04W 12/003 370/254 |
| 2007/0299956 | A1 | 12/2007 | Odaka et al. | |
| 2008/0298302 | A1* | 12/2008 | Ishida | H04L 12/2838 370/328 |
| 2009/0002751 | A1* | 1/2009 | Gha | H04M 1/7253 358/1.15 |
| 2009/0006522 | A1* | 1/2009 | Kim | H04L 29/12113 709/201 |
| 2009/0099764 | A1* | 4/2009 | Ninomiya | B63B 49/00 370/254 |
| 2009/0276525 | A1* | 11/2009 | Jo | H04L 67/2823 709/224 |
| 2012/0259594 | A1* | 10/2012 | Khan | G06T 13/60 703/1 |
| 2012/0296610 | A1* | 11/2012 | Hailemariam | G06T 19/00 703/1 |
| 2012/0310599 | A1* | 12/2012 | Tanaka | A01B 79/005 702/189 |
| 2013/0046847 | A1* | 2/2013 | Zavesky | H04W 4/70 709/217 |
| 2013/0073576 | A1* | 3/2013 | Lillethun | H04W 4/38 707/758 |
| 2013/0227569 | A1* | 8/2013 | Kohli | G06F 9/455 718/1 |
| 2013/0325407 | A1* | 12/2013 | Lee | G06F 17/00 702/188 |
| 2014/0222813 | A1* | 8/2014 | Yang | G06F 16/95 707/736 |
| 2015/0067176 | A1 | 3/2015 | Dubois et al. | |
| 2015/0234382 | A1* | 8/2015 | Ju | G01S 7/003 701/23 |
| 2015/0381737 | A1 | 12/2015 | Quinn et al. | |
| 2016/0236614 | A1 | 8/2016 | Heo | |
| 2016/0354039 | A1* | 12/2016 | Soto | G06N 5/046 |
| 2017/0180214 | A1* | 6/2017 | Azevedo | H04L 41/147 |
| 2017/0255161 | A1* | 9/2017 | Ono | B41J 2/01 |
| 2017/0257497 | A1* | 9/2017 | Ono | H04N 1/00323 |
| 2017/0289187 | A1* | 10/2017 | Noel | H04L 63/1433 |
| 2017/0329808 | A1* | 11/2017 | Lachman | H04W 4/38 |
| 2018/0309830 | A1* | 10/2018 | Kurihara | H04L 67/2842 |
| 2019/0363932 | A1* | 11/2019 | Nasu | H04L 67/12 |
| 2020/0019154 | A1* | 1/2020 | Cella | G06N 5/046 |
| 2020/0019155 | A1* | 1/2020 | Cella | G05B 13/028 |

* cited by examiner

FIG. 5

| DEVICE NAME FIELD | SENSING DATA TYPE FIELD | SENSING DATA FORMAT FIELD | RESPONSE MESSAGE FORM FIELD |
|---|---|---|---|
| DEVICE A | temperature | integer | Value Only |
| DEVICE B | temperature | float | "temperature": value |
| DEVICE C | humidity | binary | Value Only |
| DEVICE D | light | text | DISPLAY OF ONLY ON OR OFF |
| DEVICE E | lock | text | DISPLAY OF ONLY LOCK OR UNLOCK |
| ... | ... | ... | ... |

SYSTEM AND METHOD OF PROVIDING SENSING DATA TO AN ELECTRONIC DEVICE USING A TEMPLATE TO IDENTIFY A DATA TYPE AND FORMAT FOR THE ELECTRONIC DEVICE

CROSS-REFERENCE TO RELATED APPLICATION(S)

This application is based on and claims priority under 35 U.S.C. § 119(a) of a Korean patent application number 10-2017-0015133, filed on Feb. 2, 2017, in the Korean Intellectual Property Office, the disclosure of which is incorporated by reference herein in its entirety.

TECHNICAL FIELD

The disclosure relates to systems and methods of providing sensing data to an electronic device. More particularly, the disclosure relates to a system and method of providing different pieces of sensing data to at least one electronic device.

BACKGROUND

With the development of networking technology, users can transmit or receive various pieces of data by using at least one device connected via a network. In particular, when a server and at least one device are connected to a network, the server may receive data from the at least one device and provide the received data to another device.

However, devices that communicate with the server may perform differently, and thus have different data processing capabilities. Thus, technology capable of providing data in consideration of the performances of devices is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

Accordingly, an aspect of the disclosure is to provide servers and methods for providing, to first electronic devices, sensing data converted in different ways based on performance of the respective first electronic devices. Another aspect of the disclosure is to provide servers and methods for converting sensing data of a type required by a first electronic device according to a necessary format and providing converted sensing data to the first electronic device.

Additional aspects will be set forth in part in the description which follows and, in part, will be apparent from the description, or may be learned by practice of the presented embodiments.

In accordance with an aspect of the disclosure, a server for providing sensing data to at least one electronic device is provided. The server includes a communication interface configured to communicate with the at least one electronic device, a memory storing at least one instruction, and at least one processor configured to execute the at least one instruction stored in the memory, wherein the at least one processor executes the at least one instruction to receive, from a first electronic device, a first template including information about a type of sensing data required by the first electronic device and a format of the sensing data, receive a request for the sensing data from the first electronic device, select the requested sensing data from among pieces of sensing data received from at least one second electronic device, based on the received first template, in response to the request, convert the selected sensing data, based on the first template, to obtain converted sensing data, and provide a response message including the converted sensing data to the first electronic device.

The at least one processor may be further configured to execute the at least one instruction to receive, as the communication with the first electronic device is established, the first template from the first electronic device.

The first template may further include information about a form of the response message, and the at least one processor may be further configured to execute the at least one instruction to produce the response message that is to be provided to the first electronic device, based on the information about the form of the response message included in the first template.

The at least one processor may be further configured to execute the at least one instruction to receive, from the at least one second electronic device, a second template including the information about a type of sensing data required by the at least one second electronic device and a format of the sensing data, and produce a data conversion table by using the first template and the second template.

The at least one processor may be further configured to execute the at least one instruction to match the information about the type of sensing data required by the first electronic device and the format of the sensing data, which is included in the first template, with the first electronic device and register the first electronic device based on a result of the matching.

The type of sensing data required by the first electronic device may be identified based on a capability of the first electronic device.

The format of the sensing data may be identified based on at least one of a communication environment between the first electronic device and the server and a capability of the first electronic device.

The at least one processor may be further configured to execute the at least one instruction to receive, as at least one of the type of sensing data required by the first electronic device and the format of the sensing data is changed, information about the change, and update the first template, based on the received information.

In accordance with another aspect of the disclosure, a method, performed by a server, of providing sensing data to at least one electronic device is provided. The method includes receiving, from a first electronic device, a first template including information about a type of sensing data required by the first electronic device and a format of the sensing data, receiving a request for the sensing data from the first electronic device, selecting the requested sensing data from among pieces of sensing data received from at least one second electronic device, based on the received first template, in response to the request, converting the selected sensing data, based on the first template, to obtain converted sensing data, and providing a response message including the converted sensing data to the first electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a table showing information about templates registered by being respectively matched with electronic devices, according to an embodiment of the disclosure;

Throughout the drawings, it should be noted that like reference numbers are used to depict the same or similar elements, features, and structures.

DETAILED DESCRIPTION

Figure 1:
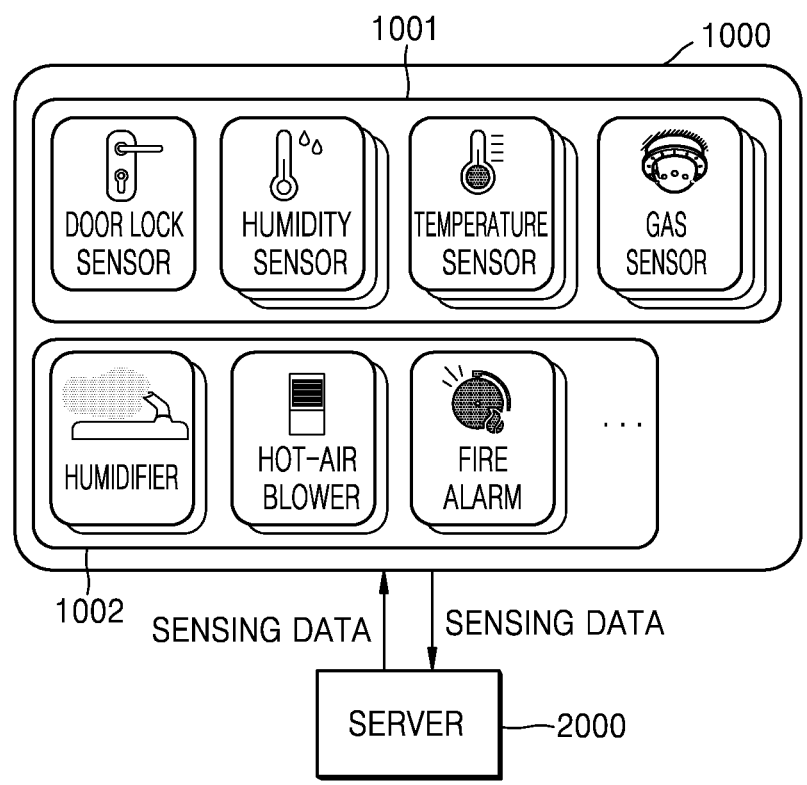
FIG. 1 is a schematic diagram illustrating an example in which a server transmits or receives sensing data to or from at least one electronic device, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments are described in detail herein with reference to the accompanying drawings so that this disclosure may be easily performed by one of ordinary skill in the art to which the disclosure pertain. The disclosure may, however, be embodied in many different forms and should not be construed as being limited to the embodiments set forth herein. In the drawings, parts irrelevant to the description are omitted for simplicity of explanation, and like numbers refer to like elements throughout.

Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

The disclosure will now be described more fully with reference to the accompanying drawings, in which embodiments of the disclosure are shown.

FIG. 1 is a schematic diagram illustrating an example in which a server transmits or receives sensing data to or from at least one electronic device, according to an embodiment of the disclosure.

Referring to FIG. 1, at least one electronic device 1000 may produce sensing data and provide the produced sensing data to a server 2000. The electronic device 1000 may be a device that is connected to various networks or a general device that is applied to the internet of things (IoT). For example, the electronic device 1000 may be implemented using a lighting-related device (such as, an electric lamp, a blind, or an illuminance sensor), a heating-related device (such as, an air conditioner, a heater, a boiler, or a temperature sensor), an atmosphere-related device (such as, an air cleaner, a humidifier, a humidity sensor, or a gas sensor), or the like. The electronic device 1000 may be a single independent device, or may be a component that is provided in service spaces, such as a car, a house, an office, an auto repair shop, and a shopping mart, and manages or controls the service spaces. For example, the electronic device 1000 may be implemented using an independent device, such as a mobile phone, a smartphone, a laptop computer, a desktop computer, a personal digital assistant (PDA), a portable multimedia player (PMP), a navigation device, a tablet personal computer (PC), a wearable device, a TV, a refrigerator, a washing machine, a monitor, a digital video disc (DVD) player, a digital camera, an electronic frame, or a kiosk.

The electronic device 1000 may include a first electronic device 1001 receiving sensing data from the server 2000, and a second electronic device 1002 providing sensing data to the server 2000. For example, as shown in FIG. 1, a humidifier, a hot-air blower, and a fire alarm may receive sensing data from the server 2000, and a door lock sensor, a humidity sensor, a temperature sensor, and a gas sensor may provide sensing data to the server 2000. However, the first electronic device 1001 and the second electronic device 1002 are divided for convenience of explanation. In some cases, the first electronic device 1001 may provide sensing data to the server 2000, and the second electronic device 1002 may receive sensing data from the server 2000.

The server 2000 may receive sensing data from the at least one second electronic device 1002, and provide the received sensing data to the first electronic device 1001. For example, the server 2000 may provide temperature data received from at least one temperature sensor to a hot-air blower, and may provide humidity data received from at least one humidity sensor to a humidifier. The server 2000 may also provide sensing data received from at least one smoke sensor to a fire alarm, and may transmit several types of sensing data respectively received from a door lock sensor, a humidity sensor, a temperature sensor, and a smoke sensor to an application provided in a smartphone. In this case, first electronic devices 1001 that receive sensing data from the server 2000 may have different performances, and may have different capabilities of processing the received sensing data. For example, when the first electronic device 1001 is a device having a relatively high data processing speed, like a smartphone, the first electronic device 1001 may receive several types of sensing data from the server 2000, and quickly parse the received pieces of sensing data to thereby easily extract necessary sensing data. On the other hand, when the first electronic device 1001 is a device having a relatively low data processing speed, like a hot-air blower or a humidifier, and receives several types of sensing data from the server 2000, it may be difficult to quickly parse the received pieces of sensing data, and relatively much time may be taken to extract necessary sensing data.

As described above, first electronic devices 1001 may require different pieces of sensing data, and the required pieces of sensing data may have different forms. Accordingly, the server 2000 according to an embodiment may pre-register pieces of sensing data respectively required by the first electronic devices 1001 and the formats of the pieces of sensing data, select the pieces of sensing data required by the first electronic devices 1001 from pieces of sensing data stored in a database (DB) of the server 2000, process the selected sensing data, and provide processed sensing data to the first electronic devices 1001.

Figure 2:
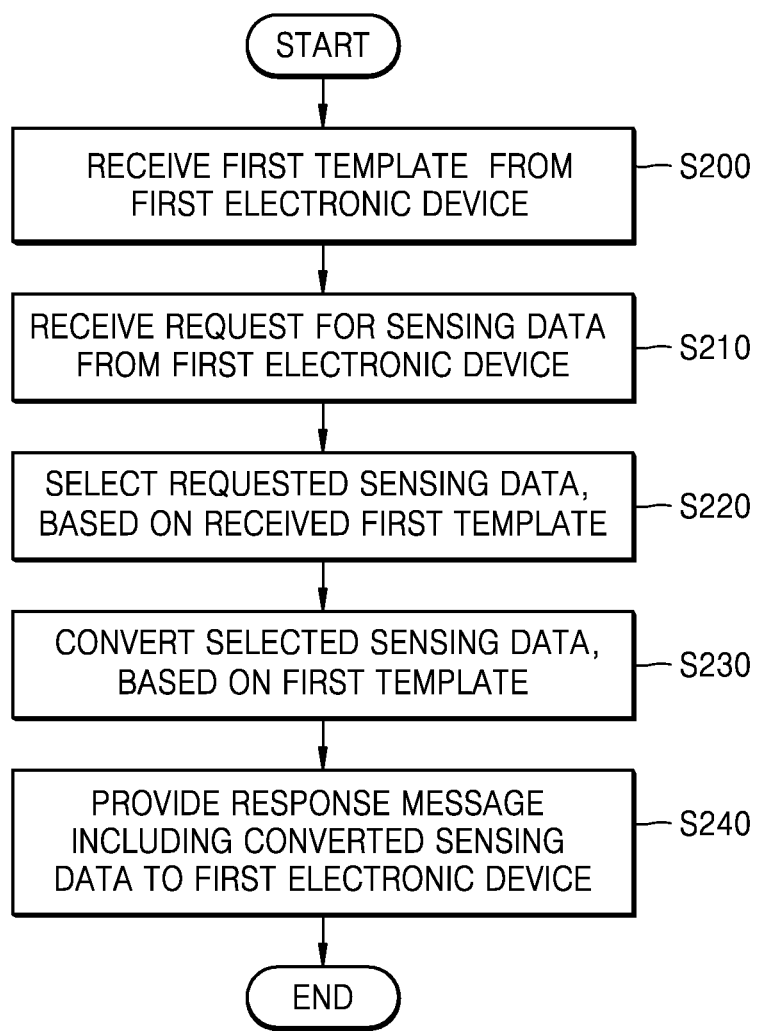
FIG. 2 is a flowchart of a method, performed by a server, of providing sensing data to at least one first electronic device, according to an embodiment of the disclosure.

FIG. 2 is a flowchart of a method, performed by a server, of providing sensing data to at least one first electronic device, according to an embodiment of the disclosure.

Referring to FIG. 2, at operation S200, the server 2000 receives from the first electronic device 1001 a first template including information about the type of sensing data required by the first electronic device 1001 and the format of the sensing data.

The first template may be information used by the server 2000 to select the sensing data required by the first electronic device 1001 and process the selected sensing data to be suitable for the first electronic device 1001. For example, the first template may include information about at least one of the type of sensing data required by the first electronic device 1001, the format of the sensing data, and the form of a response message.

The type of sensing data required by the first electronic device 1001 may be identified based on the capability of the first electronic device 1001. For example, when the first electronic device 1001 is a humidifier, the sensing data required by the first electronic device 1001 may be humidity data. When the first electronic device 1001 is a hot-air blower, the sensing data required by the first electronic device 1001 may be, but is not limited to, temperature data.

The format of the sensing data may be identified based on at least one of a communication environment between the first electronic device 1001 and the server 2000 and a capability of the first electronic device 1001. For example, when the first electronic device 1001 is a device having a relatively high data processing speed, like a smartphone, the first electronic device 1001 may receive various types of sensing data from the server 2000, and may receive sensing data of a real number format representing a more accurate value than sensing data of an integer format. On the other hand, when the first electronic device 1001 is a device having a relatively low data processing speed, like a fire alarm, the first electronic device 1001 may receive only a single type of sensing data (for example, sensing data representing generation or non-generation of smoke) required by the first electronic device 1001 from the server 2000. The format of the sensing data may be identified based on not only the capability of the first electronic device 1001 but also the communication environment between the first electronic device 1001 and the server 2000. The communication environment between the first electronic device 1001 and the server 2000 may include, but is not limited to, stability of communication, communication costs, and communication load.

For example, when communication between the first electronic device 1001 and the server 2000 is unstable, the probability that an error occurs when sensing data is transmitted or received may increase. In this case, the first electronic device 1001 may receive sensing data having a format that ensures a relatively small data size from the server 2000 to thereby reduce the probability that an error occurs when sensing data is transmitted or received.

According to another embodiment, even when the first electronic device 1001 provides a relative high data processing speed, when a communication load between the first electronic device 1001 and the server 2000 is great, the first electronic device 1001 may receive sensing data having a format that ensures a relatively small data size from the server 2000. Accordingly, the probability that an error occurs when data is transmitted or received and the communication load between the first electronic device 1001 and the server 2000 may be reduced.

As the server 2000 according to an embodiment establishes communication with the first electronic device 1001, the server 2000 may receive the first template from the first electronic device 1001. For example, as the first electronic device 1001 is connected to the server 2000 to be registered, the server 2000 may receive meta data including the first template from the first electronic device 1001.

At operation S210, the server 2000 receives a request for sensing data from the first electronic device 1001. For example, the server 2000 may receive a message requesting sensing data, from the first electronic device 1001.

At operation S220, the server 2000 selects the sensing data requested by the first electronic device 1001 from among pieces of sensing data received from at least one second electronic device 1002, based on the received first template.

The server 2000 according to an embodiment may receive the pieces of sensing data from the at least one second electronic device 1002, and the first electronic device 1001 may receive, from the server 2000, sensing data required by the first electronic device 1001 from among the pieces of sensing data received by the server 2000. For example, in a home network system, the server 2000 may receive temperature data, humidity data, and data representing whether the door has been locked, from a temperature sensor, a humidity sensor, and a door lock sensor provided within a house.

The first electronic device 1001 may require only a specific type of sensing data from among the pieces of sensing data received from the at least one second electronic device 1002. The server 2000 selects the sensing data requested by the first electronic device 1001 from among the pieces of sensing data received from at least one second electronic device 1002, based on the received first template. For example, a hot-air blower set to be automatically turned on when the internal temperature of a house is equal to or less than a threshold may require only temperature data from among the pieces of sensing data stored in the DB of the server 2000. In this case, the server 2000 may select the temperature data from among the pieces of sensing data stored in the DB of the server 2000, based on a first template received from the hot-air blower.

At operation S230, the server 2000 converts the selected sensing data, based on the first template. The pieces of sensing data received by the server 2000 according to an embodiment from the at least one second electronic device 1002 may have different formats from a format of the sensing data required by the first electronic device 1001. For example, sensing data received by the server 2000 from a second electronic device 1002 may be temperature data of a real number format, and the sensing data required by the first electronic device 1001 may be temperature data of an integer format. In this case, the server 2000 may process the sensing data to have a format required by the first electronic device 1001, based on the first template received from the first electronic device 1001.

At operation S240, the server 2000 provides a response message including converted sensing data to the first electronic device 1001.

The server 2000 according to an embodiment selects a type of sensing data required by the first electronic device 1001 from among the pieces of sensing data received from the at least one second electronic device 1002, converts the selected sensing data according to a format required by the first electronic device 1001, and provides converted sensing data to the first electronic device 1001, thereby reducing the number of calculations required by the first electronic device 1001 to process the sensing data received from the server 2000.

Figure 3:
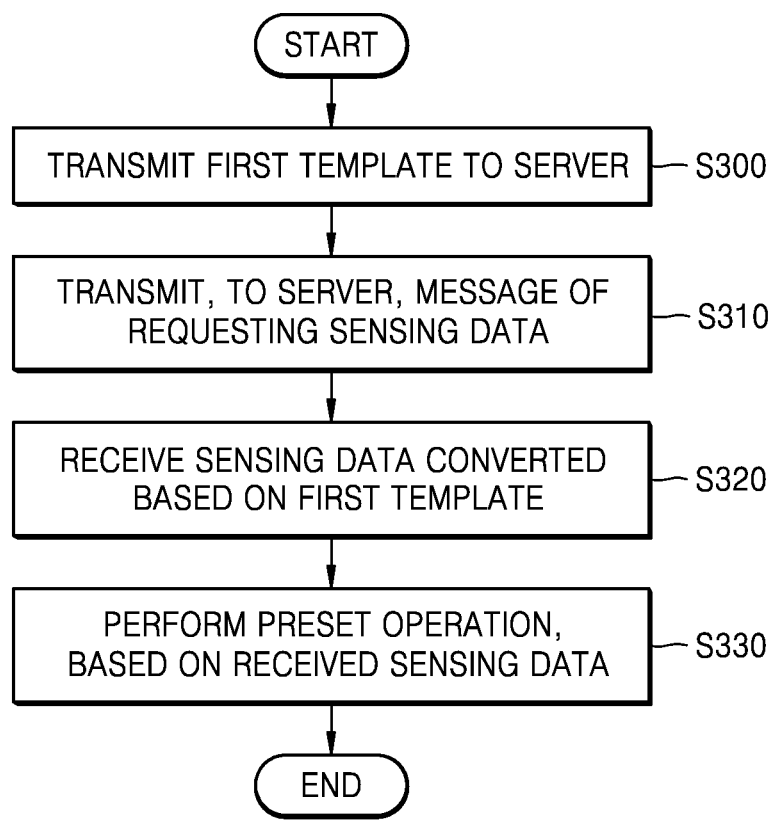
FIG. 3 is a flowchart of a method, performed by a first electronic device, of receiving sensing data from a server, according to an embodiment of the disclosure.

FIG. 3 is a flowchart of a method, performed by a first electronic device, of receiving sensing data from a server, according to an embodiment of the disclosure.

Referring to FIG. 3, at operation S300 the first electronic device 1001 may transmit, to the server 2000, a first template including information about the type of sensing data required by the first electronic device 1001 and the format of the sensing data. As described above, the first template may be information used by the server 2000 to select the sensing data required by the first electronic device 1001 and process the selected sensing data to be suitable for the first electronic device 1001. For example, the first template may include information about the type of sensing data required by the first electronic device 1001 and the format of the sensing data.

As the first electronic device 1001 according to an embodiment establishes communication with the server 2000, the first electronic device 1001 may transmit the first template to the server 2000. For example, when the first electronic device 1001 initially establishes communication with the server 2000 so as to be registered in the server 2000, the first electronic device 1001 may transmit the first template to the server 2000. The server 2000 may store the received first template. In response to a request for sensing data received from the first electronic device 1001, the server 2000 may select the sensing data requested by the first electronic device 1001 from among the pieces of sensing data stored in the DB of the server 2000, based on the stored first template.

The server 2000 may process the selected sensing data to be suitable for the first electronic device 1001, based on the first template, and provide the processed sensing data to the first electronic device 1001. Accordingly, after the first template is transmitted to the server 2000 as the first electronic device 1001 establishes communication with the server 2000, the first electronic device 1001 does not need to repeatedly transmit the first template.

However, when at least one of the type of sensing data required by the first electronic device 1001 and the format of the sensing data is changed, the first electronic device 1001 may transmit information about the change to the server 2000. For example, as firmware of the first electronic device 1001 is updated, at least one of the type of sensing data required by the first electronic device 1001 and the format of the sensing data may be changed. In this case, the first electronic device 1001 may transmit information about the change to the server 2000. The server 2000 may update the first template, based on the information received from the first electronic device 1001.

At operation S310, the first electronic device 1001 may request the server 2000 for sensing data. For example, the first electronic device 1001 may transmit to the server 2000 a message requesting the sensing data.

At operation S320, the first electronic device 1001 may receive the sensing data converted based on the first template from the server 2000. In this case, the server 2000 may select temperature data from among the pieces of sensing data stored in the DB of the server 2000, based on the first template, and may provide the first electronic device 1001 with data obtained by converting the selected temperature data to a binary number format. Accordingly, the first electronic device 1001 may receive only necessary sensing data from the server 2000 by previously transmitting, to the server 2000, information about the type of sensing data required by the first electronic device 1001. In addition, the first electronic device 1001 may receive sensing data having a format easily processable by the first electronic device 1001 from the server 2000 by previously transmitting information about the format of desired sensing data to the server 2000.

At operation S330, the first electronic device 1001 may perform a preset operation, based on the received sensing data. The first electronic device 1001 according to an embodiment may compare the received sensing data with a preset threshold and may perform a predetermined operation according to a result of the comparison. For example, the first electronic device 1001 may control an alarm to be displayed when the received sensing data is less than the preset threshold or the first electronic device 1001 to be automatically turned on when the received sensing data is greater than the preset threshold. However, the preset operation that is performed based on the received sensing data may vary based on the type of first electronic device 1001, but embodiments are not limited thereto.

Figure 4:
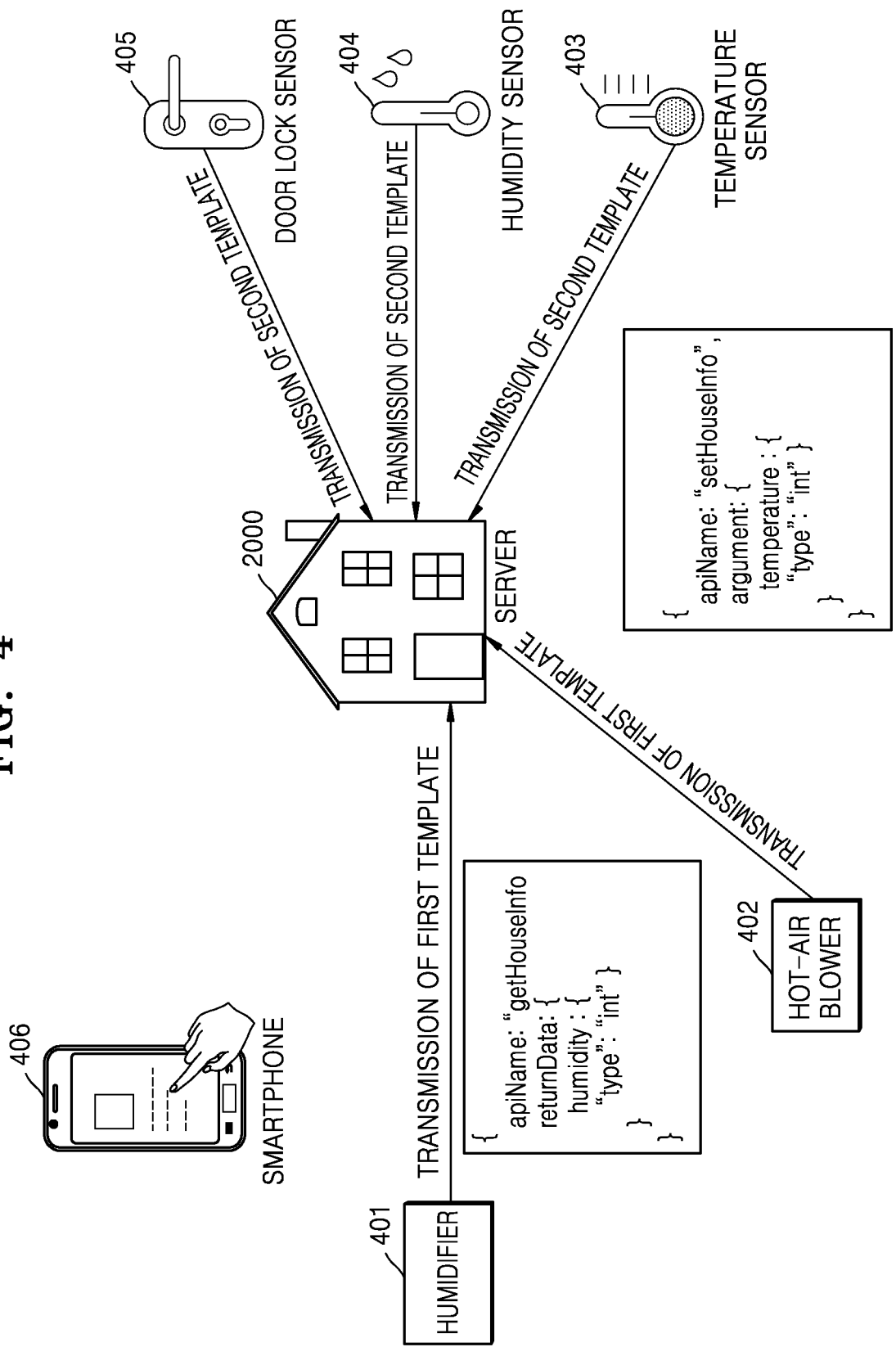
FIG. 4 is a schematic diagram illustrating an example in which a server receives a template from at least one electronic device, according to an embodiment of the disclosure.

FIG. 4 is a schematic diagram illustrating an example in which a server receives a template from at least one electronic device, according to an embodiment of the disclosure.

Referring to FIG. 4, the server 2000 according to an embodiment may provide sensing data to a first electronic device 1001 or receive sensing data from a second electronic device 1002. However, in some cases, the first electronic device 1001 may provide sensing data to the server 2000, and the second electronic device 1002 may receive sensing data from the server 2000.

The sensing data received from the second electronic device 1002 may be sensing data produced based on a second template by the second electronic device 1002. The second template may include information representing the format to which the second electronic device 1002 is to process the sensing data in order to provide processed sending data to the server 2000. For example, the second template may include information about the type of sensing data provided by the second electronic device 1002 and the format of the sensing data. The second electronic device 1002 may previously store the second template in the second electronic device 1002, process sensing data obtained by the second electronic device 1002 by using the second template, and provide processed sensing data to the server 2000. The second template stored in the second electronic device 1002 may be provided to the server 2000, and the server 2000 may interpret the sensing data received from the second electronic device 1002, based on the second template.

The server 2000 according to an embodiment may receive a template corresponding to each electronic device 1000, from the electronic device 1000. For example, the server 2000 may receive the first template from the first electronic device 1001 and receive the second template from the second electronic device 1002.

For example, in the case of a home network system of FIG. 4, the at least one electronic device 1000 may include various sensors and home appliances provided in a house, and the server 2000 may communicate with the various sensors and home appliances.

As shown in FIG. 4, the at least one electronic device 1000 may include, but is not limited to, a humidifier 401, a hot-air blower 402, a temperature sensor 403, a humidity sensor 404, a door lock sensor 405, and a smartphone 406. For example, the humidifier 401 and the hot-air blower 402 may be embodiments of the first electronic device 1001 receiving sensing data from the server 2000, and the temperature sensor 403, the humidity sensor 404, and the door lock sensor 405 may be embodiments of the second electronic device 1002 providing sensing data to the server 2000.

Referring to FIG. 4, the type of sensing data required by the humidifier 401 and the format of the sensing data may be different from the type of sensing data required by the hot-air blower 402 and the format of the sensing data. For example, the humidifier 401 may require humidity data, and the hot-air blower 402 may require temperature data. The formats of the pieces of sensing data may be identified based on at least one of a communication environment between each of the humidifier 401 and the hot-air blower 402 and the server 2000 and capabilities of the humidifier 401 and the hot-air blower 402. Accordingly, for example, the humidifier 401 may require humidity data of an integer format, and the hot-air blower 402 may require temperature data of a real number format.

In this case, the humidifier 401 and the hot-air blower 402 may transmit to the server 2000 first templates including information about the types of pieces of sensing data respectively required by the humidifier 401 and the hot-air blower 402 and the formats of the pieces of sensing data. For example, the humidifier 401 may transmit, to the server 2000, a first template representing that the sensing data required by the humidifier 401 is temperature data of an integer format. A first template according to an embodiment may be represented using a light-weight standard data exchange format, such as javascript object notation (JSON), but embodiments are not limited thereto.

Referring to FIG. 4, the types of pieces of sensing data respectively required by the temperature sensor 403, the humidity sensor 404, and the door lock sensor 405 may be different from each other, and the formats of the pieces of sensing data may be different from each other. For example, the temperature sensor 403 may provide temperature data, the humidity sensor 404 may provide humidity data, and the door lock sensor 405 may provide data representing whether the door has been locked. In this case, the temperature sensor 403, the humidity sensor 404, and the door lock sensor 405 may transmit, to the server 2000, second templates including information about the types of pieces of sensing data respectively provided by the temperature sensor 403, the humidity sensor 404, and the door lock sensor 405 and the formats of the pieces of sensing data. When the temperature sensor 403, the humidity sensor 404, and the door lock sensor 405 provide sensing data to the server 2000, the temperature sensor 403, the humidity sensor 404, and the door lock sensor 405 may process sensing data by using the second templates and provide processed sensing data to the server 2000. Accordingly, the server 2000 and the at least one electronic device 1000 transmit only necessary sensing data, thereby more quickly transmitting or receiving sensing data even when the data processing speed of the electronic device 1000 is relatively low. The server 2000 and the at least one electronic device 1000 may transmit or receive sensing data in consideration of a communication environment between the server 2000 and the at least one electronic device 1000.

According to an embodiment, the at least one electronic device 1000 may call the same application programming interface (API) to request the server 2000 for sensing data. For example, referring to FIG. 4, the humidifier 401 and the hot-air blower 402 may call the same getHouseInfo( ) API to request the server 2000 for sensing data. Moreover, even when the types of pieces of sensing data respectively required by electronic devices 1000 and/or the formats of the pieces of sensing data are different from each other, the electronic devices 1000 do not need to individually set parameters of an API. For example, as shown in FIG. 4, even when the humidifier 401 requires humidity data of an integer format and the hot-air blower 402 requires temperature data of a real number format, the humidifier 401 and the hot-air blower 402 do not need to individually set parameters of an API, such as "int" or "float".

Even when the same API is called by different electronic devices 1000, the server 2000 according to an embodiment may provide different pieces of sensing data converted based on templates respectively received from the electronic devices 1000 to the electronic devices 1000, respectively. For example, as shown in FIG. 4, when the humidifier 401 calls a getHouseInfo( ) API, the server 2000 may process sensing data required by the humidifier 401, based on a first template received from the humidifier 401. Accordingly, the server 2000 may select humidity data from the pieces of sensing data stored in the DB, convert the selected humidity data into the integer format, and provide converted humidity data to the humidifier 401. When the hot-air blower 402 calls the same getHouseInfo( ) API, the server 2000 may process sensing data required by the hot-air blower 402, based on a first template received from the hot-air blower 402. Accordingly, the server 2000 may select temperature data from the pieces of sensing data stored in the DB, convert the selected temperature data into the real number format, and provide converted temperature data to the hot-air blower 402.

According to an embodiment, the at least one electronic device 1000 may call the same API and provide sensing data to the server 2000. For example, even when the temperature sensor 403 provides integer-type temperature data and the humidity sensor 404 provides integer-type humidity data, the temperature sensor 403 and the humidity sensor 404 may call the same setHouseInfo( ) API and provide the sensing data to the server 2000. Accordingly, according to an embodiment, even when a new electronic device 1000 is added to a network or the format of sensing data required by the electronic device 1000 is changed according to, for example, a change in firmware of the electronic device 1000, there is no need to add a new API or change the parameters of an API.

Referring to FIG. 4, the smartphone 406 may provide an application for controlling a home network. The application for controlling a home network may include at least one application, according to the type of sensing data or a home appliance to be controlled. When a user manages the home network system by using a single application, the server 2000 may provide the pieces of sensing data stored in the DB of the server 2000 to the smartphone 406, in response to a request for sensing data received from the smartphone 406. On the other hand, for example, when the smartphone 406 provides a plurality of control applications according the type of sensing data or a home appliance, the smartphone 406 may transmit to the server 2000 a first template including sensing data required by each application and information representing the format of the sensing data. In response to a request for sensing data received from a specific application of the smartphone 406, the server 2000 may select sensing data required by the specific application, based on the received first template, process the selected sensing data, and provide processed sensing data to the specific application.

FIG. 5 is a table showing information about templates registered by being respectively matched with electronic devices, according to an embodiment of the disclosure.

Referring to FIG. 5, a table 500 represents information about templates registered by being respectively matched with electronic devices 1000. For example, the table 500 representing information about templates registered by being respectively matched with the electronic devices 1000 may include a device name field 501, a sensing data type field 502, a sensing data format field 503, and a response message form field 504.

The first electronic device 1001 according to an embodiment may transmit, to the server 2000, a first template including at least one of pieces of information about the type of sensing data required by the first electronic device 1001, the format of the sensing data, and the form of a response message including the sensing data. For example, when at least one first electronic device 1001 and the server 2000 communicate with each other via a home network, the types of sensing data may include temperature data, humidity data, whether a lamp has been switched on or off, whether the door has been locked, whether gas leaks, and the like. The formats of the sensing data may include an integer, a real number, a binary number, and text, and the forms of the response message may include information about whether only the sensing data is transmitted and whether the sensing data is transmitted together with information representing the type of sensing data.

Referring to FIG. 5, a device A and a device B may be devices that require temperature data, like hot-air blowers or heating control devices. In this case, unlike the device B receiving temperature data of the real number format, the device A may receive temperature data of the integer format, and may receive a response message including only the value of the temperature data. For example, when the device A has a lower capability than the device B, the device A receives the temperature data of the integer format and receives a response message including only the value of the temperature data, and thus may receive only necessary sensing data from the server 2000.

The device C may be a device that requires humidity data, for example, a humidifier. The device C may require humidity data of the binary number format according to internal settings of the device C, and may require a response message including only the value of the humidity data.

The device D may be, for example, a control device for controlling a home network. For example, the device D may receive sensing data representing whether a lamp provided within a house has been switched on or off, and may automatically control an on/off status of the lamp, based on the received sensing data. In this case, the device D may require sensing data representing whether the lamp has been switched on or off, from among the pieces of sensing data stored in the DB of the server 2000. For example, the sensing data representing whether the lamp has been switched on or off may be expressed in a text format, such as "On" or "Off", but embodiments are not limited thereto. In some cases, the sensing data representing whether the lamp has been switched on or off may be expressed as numbers of preset values respectively matched with "On" and "Off".

The device E may be, for example, a control device for controlling a security system of a house. For example, the device E may receive sensing data representing whether the door has been locked, and may control the door to be automatically locked, based on the received sensing data. In this case, the device E may require sensing data representing whether the door has been locked, from among the pieces of sensing data stored in the DB of the server 2000. For example, the sensing data representing whether the door has been locked may be expressed in a text format, such as "Lock" or "Unlock". Types of pieces of information included in the templates may vary according to embodiments, and the disclosure is not limited thereto.

Figure 6:
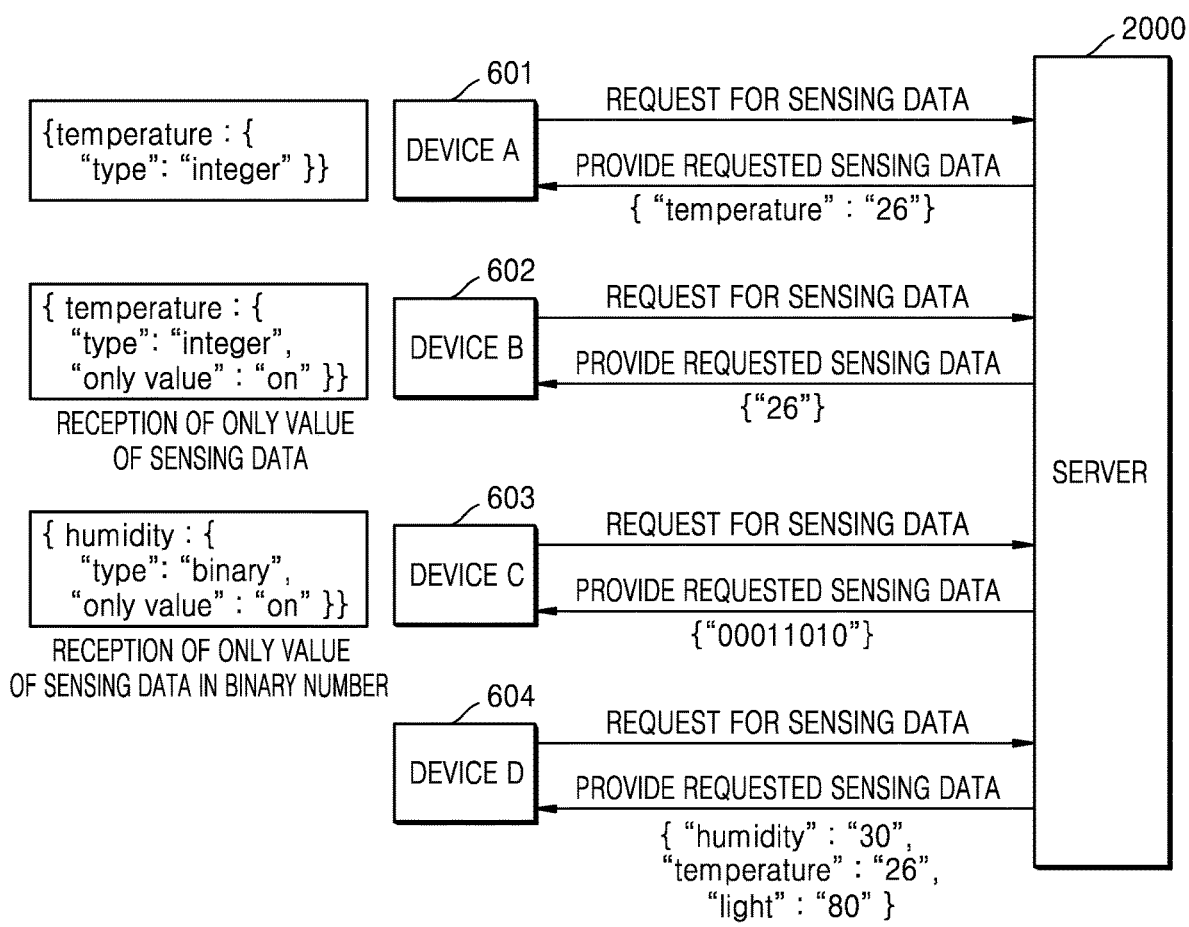
FIG. 6 is a schematic diagram illustrating an example in which a server and at least one first electronic device transmit or receive sensing data to or from each other, according to an embodiment of the disclosure.

FIG. 6 is a schematic diagram illustrating an example in which a server and at least one first electronic device transmit or receive sensing data to or from each other, according to an embodiment of the disclosure.

Referring to FIG. 6, the server 2000 according to an embodiment may communicate with at least one electronic device 1000. When the server 2000 establishes communication with a first electronic device 1001, the server 2000 may receive a first template from the first electronic device 1001. For example, the first template may include information about the type of sensing data required by the first electronic device 1001 and the format of the sensing data. The server 2000 may receive produced sensing data from at least one second electronic device 1002, and store the received sensing data in the DB of the server 2000. The server 2000 may select certain sensing data from among the pieces of sensing data stored in the DB and provide the selected sensing data to the first electronic device 1001. At this time, the server 2000 may select sensing data required by the first electronic devices 1001 from the pieces of sensing data stored in the DB of the server 2000, based on the received first template, process the selected sensing data to have a format required by the first electronic device 1001, and provide the processed sensing data to the first electronic device 1001.

Referring to FIG. 6, the first electronic device 1001 may include devices A 601 through D 604. In this case, the type of sensing data may be identified based on a capability of the first electronic device 1001. For example, the device A 601 and the device B 602 may be hot-air blowers that require temperature data, and the device C 603 may be a humidifier that requires humidity data. The format of sensing data may be identified based on at least one of a communication environment between the first electronic device 1001 and the server 2000 and a capability of the first electronic device 1001. For example, when the data processing speed of the first electronic device 1001 is relatively high, the first electronic device 1001 may receive sensing data of a format representing an accurate value even when having a relatively large data size (for example, sensing data of a real number format). On the other hand, when the data processing speed of the first electronic device 1001 is relatively low, the first electronic device 1001 may receive sensing data of a format having a small size of data even when the accuracy of a value is low (for example, sensing data of an integer format). The format of sensing data may be identified based on not only the capability of the first electronic device 1001 but also the communication environment between the first electronic device 1001 and the server 2000. For example, when a communication load between the first electronic device 1001 and the server 2000 is relatively large, the first electronic device 1001 may reduce the communication load with the server 2000 by receiving integer-format sensing data from the server 2000.

Referring to FIG. 6, the device A 601 may require integer-format temperature data, and the device B 602 may require integer-format temperature data and may desire to receive a response message including only the value of the temperature data from the server 2000. The device C 603 may require humidity data of a binary number format. Accordingly, the server 2000 may receive first templates respectively corresponding to the devices A 601 through D 604 from the devices A 601 through D 604, convert sensing data by using the received first templates, and provide converted sensing data. Accordingly, the server 2000 may provide the at least one first electronic device 1001 with sensing data converted according to a capability of each first electronic device 1001.

Referring to FIG. 6, the server 2000 may select temperature data from among the pieces of sensing data received from the at least one second electronic device 1002, in response to a request for sensing data received from the device A 601, convert the selected temperature data into an integer format, and provide converted temperature data to the device A 601. For example, as shown in FIG. 6, the device A 601 may receive, from the server 2000, a response message including the type of sensing data received by the device A 601 (for example, "temperature") and the value of integer-format temperature data (for example, "26").

The first template received by the server 2000 from the device B 602 may further include information about the form of the response message. For example, the device B 602 may desire to receive a response message including only the value of the sensing data requested by the device B 602 from the server 2000. In response to a request for sensing data received from the device B 602, the server 2000 may select temperature data from among the pieces of sensing data received from the at least one second electronic device 1002, convert the selected temperature data to an integer format, and provide converted temperature data to the device B 602. At this time, the server 2000 may provide a response message including only the value of the integer-format temperature data (for example, "26") to the device B 602.

The device C 603 may require humidity data of a binary number format. In response to a request for sensing data received from the device C 603, the server 2000 may select humidity data from among the pieces of sensing data received from the at least one second electronic device 1002, convert the selected humidity data to a binary number format, and provide converted humidity data to the device C 603.

As another example, when the server 2000 receives no templates from the device D 604, the server 2000 may provide sensing data converted based on a preset template to the device D 604. For example, the server 2000 may provide the pieces of sensing data received from the at least one second electronic device 1002 to the device D 604. For example, referring to FIG. 6, the server 2000 may provide humidity data, temperature data, and data representing whether the door has been locked, which are received from the at least one second electronic device 1002, to the device D 604.

Figure 7:
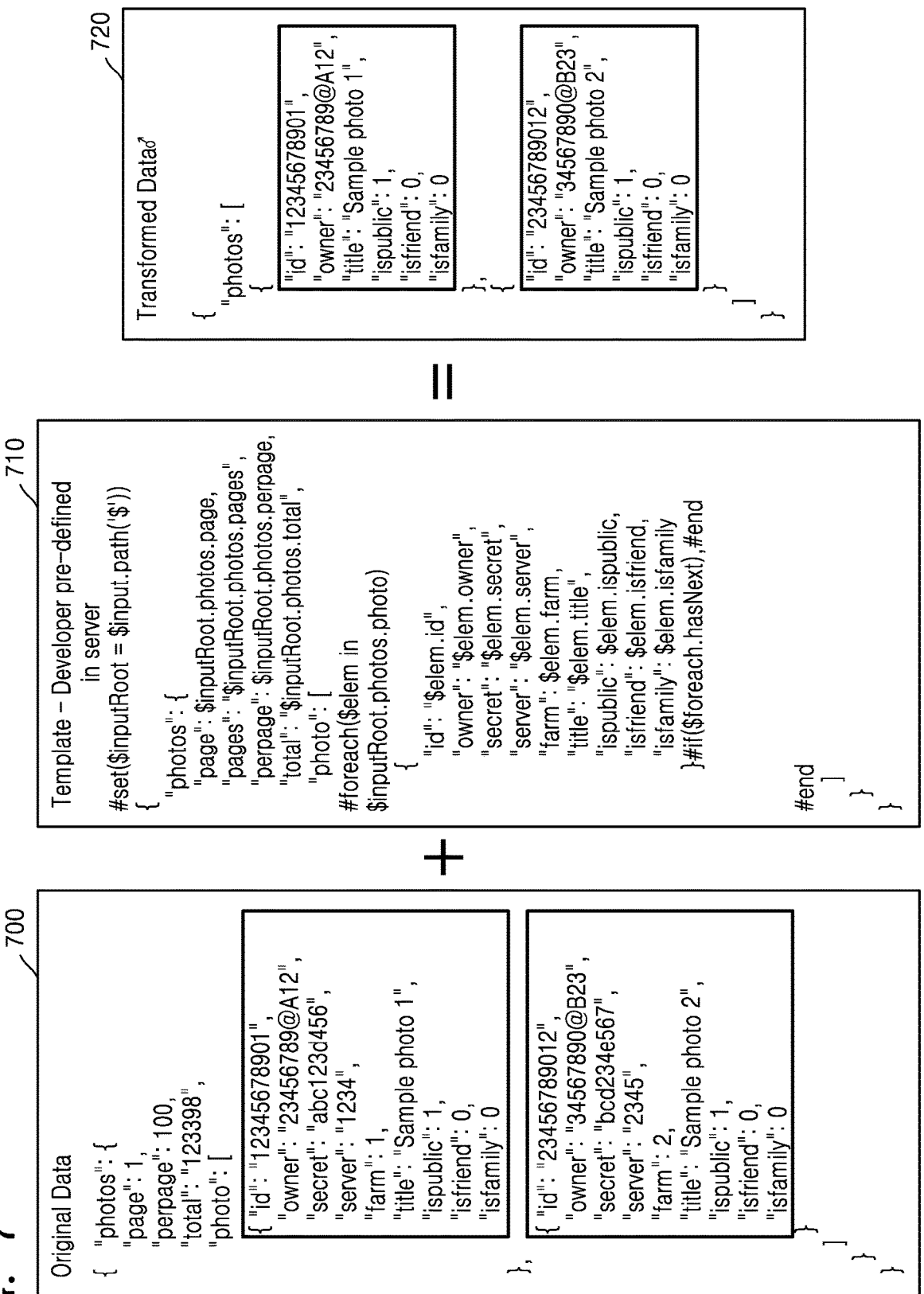
FIG. 7 illustrates an example in which a server converts sensing data by using a first template, according to an embodiment of the disclosure.

FIG. 7 illustrates an example in which a server converts sensing data by using a first template, according to an embodiment of the disclosure.

Referring to FIG. 7, original data 700, a template 710 used to convert the original data 700, and converted data 720 obtained based on the template 710 may be represented using JSON. As shown in FIG. 7, the original data 700 represents 9 pieces of information including a photo identifier (ID) ("id"), a photo owner ("owner"), a photo title ("title"), etc., for each of two photos stored in a DB. A user may require, for example, only 6 pieces of information including a photo ID, a photo owner, a photo title from among the 9 pieces of information included in the original data 700. Accordingly, the template 710 used to convert the original data 700 may represent types of information required by the user (for example, 6 pieces of information including a photo ID, a photo owner, and a photo title). The converted data 720 obtained by converting the original data 700 by using the template 710 may include only 6 pieces of information selected by the user from among the 9 pieces of information included for each of the two photos in the original data 700. Accordingly, the user may easily select information desired by the user from among the pieces of information included in the original data 700, by applying the template 710 to the original data 700.

Figure 8:
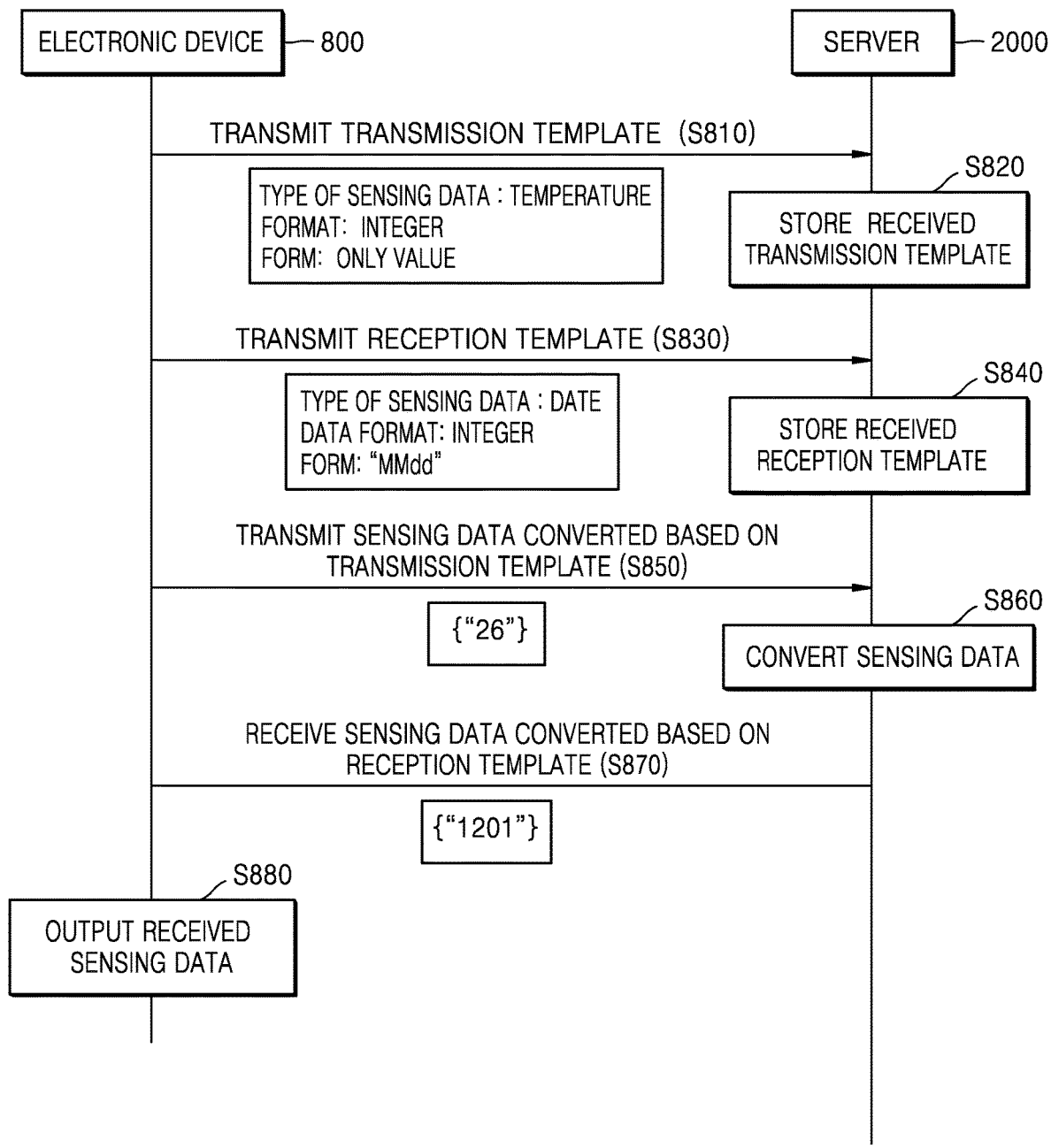
FIG. 8 is a flowchart of an example in which an electronic device differently sets a template used when transmitting sensing data and a template used when receiving sensing data, according to an embodiment of the disclosure.

FIG. 8 is a flowchart of an example in which an electronic device differently sets a template used when transmitting sensing data and a template used when receiving sensing data, according to an embodiment of the disclosure.

Referring to FIG. 8, an electronic device 800 according to an embodiment may receive sensing data required by the electronic device 800 from the server 2000, and may provide sensing data produced by the electronic device 800, which is of different type from the sensing data received from the server 2000, to the server 2000.

The electronic device 800 may transmit temperature data produced by the electronic device 800 to the server 2000 and may receive date data from the server 2000. At this time, the electronic device 800 may transmit, to the server 2000, a transmission template including information about the type of sensing data provided by the electronic device 800 and the format of the sensing data and a reception template including information about the type of sensing data required by the electronic device 800 and the format of the sensing data. In this case, the transmission template may be the above-described first template, and the reception template may be the above-described second template.

Transmission data transmitted by the electronic device 800 to the server 2000 and transmission data required by the electronic device 800 may be different from each other in terms of at least one of the type of transmission data, the format of the transmission data, and the form of a response message, and accordingly, the transmission template and the reception template may be different. Accordingly, as the electronic device 800 establishes communication with the server 2000, the electronic device 800 may transmit the transmission template and the reception template to the server 2000.

Referring to FIG. 8, at operation S810, the electronic device 800 may transmit, to the server 2000, a transmission template representing that the type of sensing data provided by the electronic device 800 is temperature data, the format of the sensing data is an integer format, and a response message includes only the value of the temperature data. At operation S830, the electronic device 800 may transmit, to the server 2000, a reception template representing that the type of sensing data required by the electronic device 800 is date data, the format of the sensing data is an integer format, and the form of the sensing data is "MMdd". At operations S820 and S840, the server 2000 may store the received transmission template and the received reception template.

At operation S850, the electronic device 800 may convert the sensing data by using the transmission template and may transmit processed sensing data to the server 2000. For example, as shown in FIG. 8, the electronic device 800 may convert sensed temperature data to an integer format, based on the transmission template, and transmit only a value ("26") of the converted temperature data to the server 2000.

The electronic device 800 may receive integer-format date data in a "MMdd" format from the server 2000. For example, referring to FIG. 8, the server 2000 may convert date data in a "1201" format, at operation S860, and the electronic device 800 may receive the converted date data in the "1201" format from the server 2000, at operation S870.

At operation S880, the electronic device 800 may perform a preset operation, based on the received sensing data. For example, the electronic device 800 may convert "1201" to a format "December 1" and display "December 1" on a screen of the electronic device 800. However, the preset operation that is performed based on the received sensing data may vary based on embodiments, but the disclosure is not limited thereto.

As described above, the electronic device 800 may efficiently transmit or receive the sensing data by differently setting the transmission template and the reception template.

Figure 9:
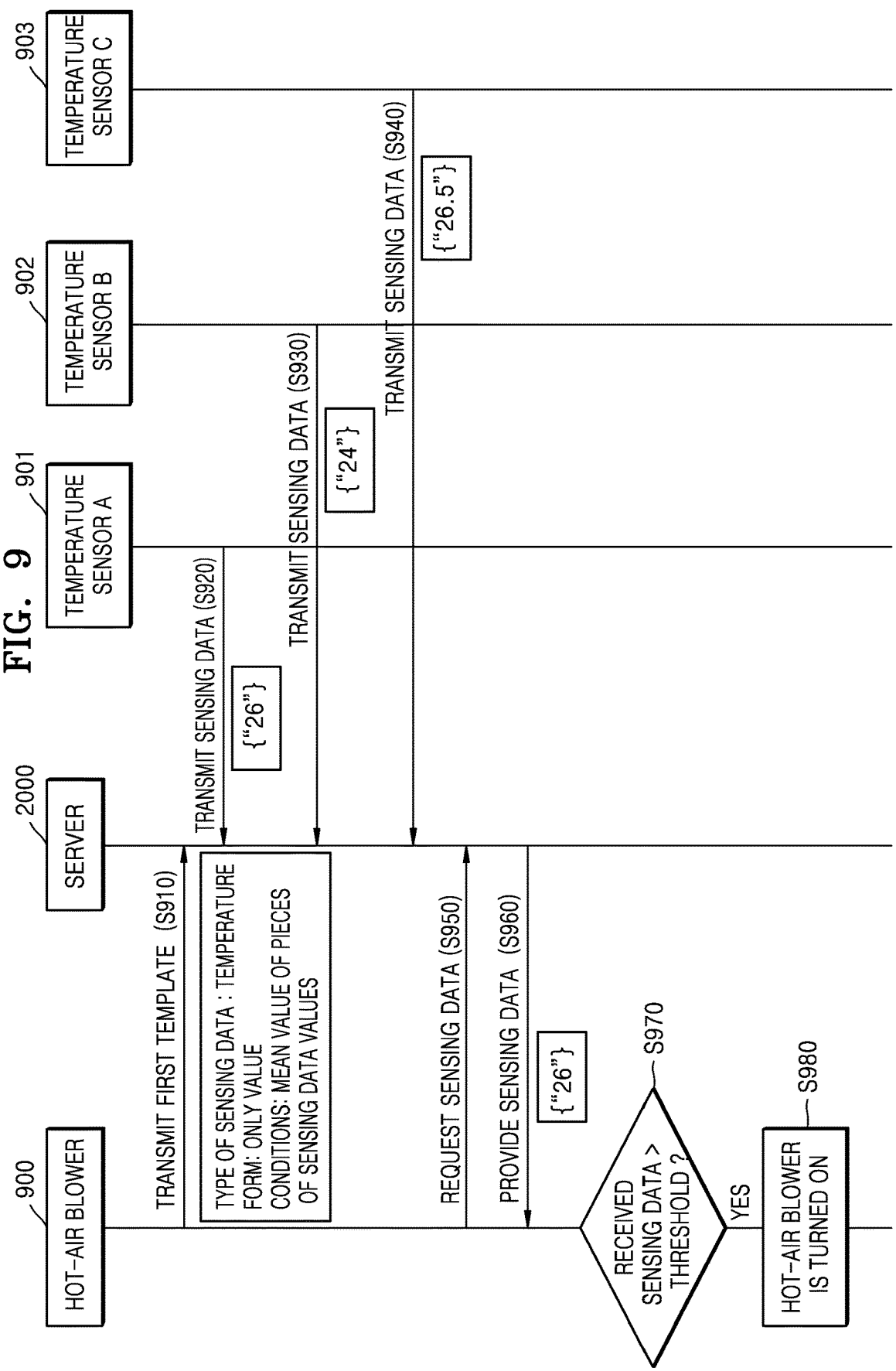
FIG. 9 is a flowchart of an example in which a first template includes information about the conditions of sensing data, according to an embodiment of the disclosure.

FIG. 9 is a flowchart of an example in which a first template includes information about the conditions of sensing data, according to an embodiment of the disclosure.

Referring to FIG. 9, the server 2000 according to an embodiment may receive, from the first electronic device 1001, a first template including information about not only the type of sensing data required by the first electronic device 1001 and the format of the sensing data but also the conditions of the sensing data required by the first electronic device 1001. For example, the server 2000 may select pieces of sensing data required by the first electronic device 1001 from among the pieces of sensing data received from the at least one second electronic device 1002. The server 2000 may provide sensing data that satisfies the conditions of the sensing data required by the first electronic device 1001, from among the selected pieces of sensing data, to the first electronic device 1001.

The first electronic device 1001 may be a hot-air blower 900, the server 2000 may be the server 2000 connected to a home network system, and the at least one second electronic device 1002 may be a temperature sensor A 901, a temperature sensor B 902, and a temperature sensor C 903.

In this case, at operation S910, the server 2000 may receive a first template from the hot-air blower 900. For example, the first template may include information representing that the hot-air blower 900 requires a mean value of pieces of temperature data stored in the DB of the server 2000 in an integer format. At operations S920, S930, and S940, the server 2000 may receive pieces of temperature data (for example, "26", "24", and "26.5") from the temperature sensor A 901, the temperature sensor B 902, and the temperature sensor C 903.

In response to a request for sensing data received from the hot-air blower 900 at operation S950, the server 2000 according to an embodiment may convert the temperature data by using the first template and provide converted temperature data to the hot-air blower 900, at operation S960. For example, as shown in FIG. 9, the server 2000 may convert a mean value ("25.5") of the pieces of temperature data received from the temperature sensor A 901, the temperature sensor B 902, and the temperature sensor C 903 into an integer format, and may provide a mean value ("26") of the converted pieces of temperature data to the hot-air blower 900.

The hot-air blower 900 may perform a preset operation, based on the received sensing data. For example, as shown in FIG. 9, when it is determined at operation S970 that the received sensing data is less than a preset threshold, the hot-air blower 900 may automatically operate, at operation S980. Accordingly, the hot-air blower 900 may more accurately determine a situation where an operation of the hot-air blower 900 is needed, by automatically operating based on the temperature data produced from a plurality of temperature sensors provided in a house.

Figure 10:
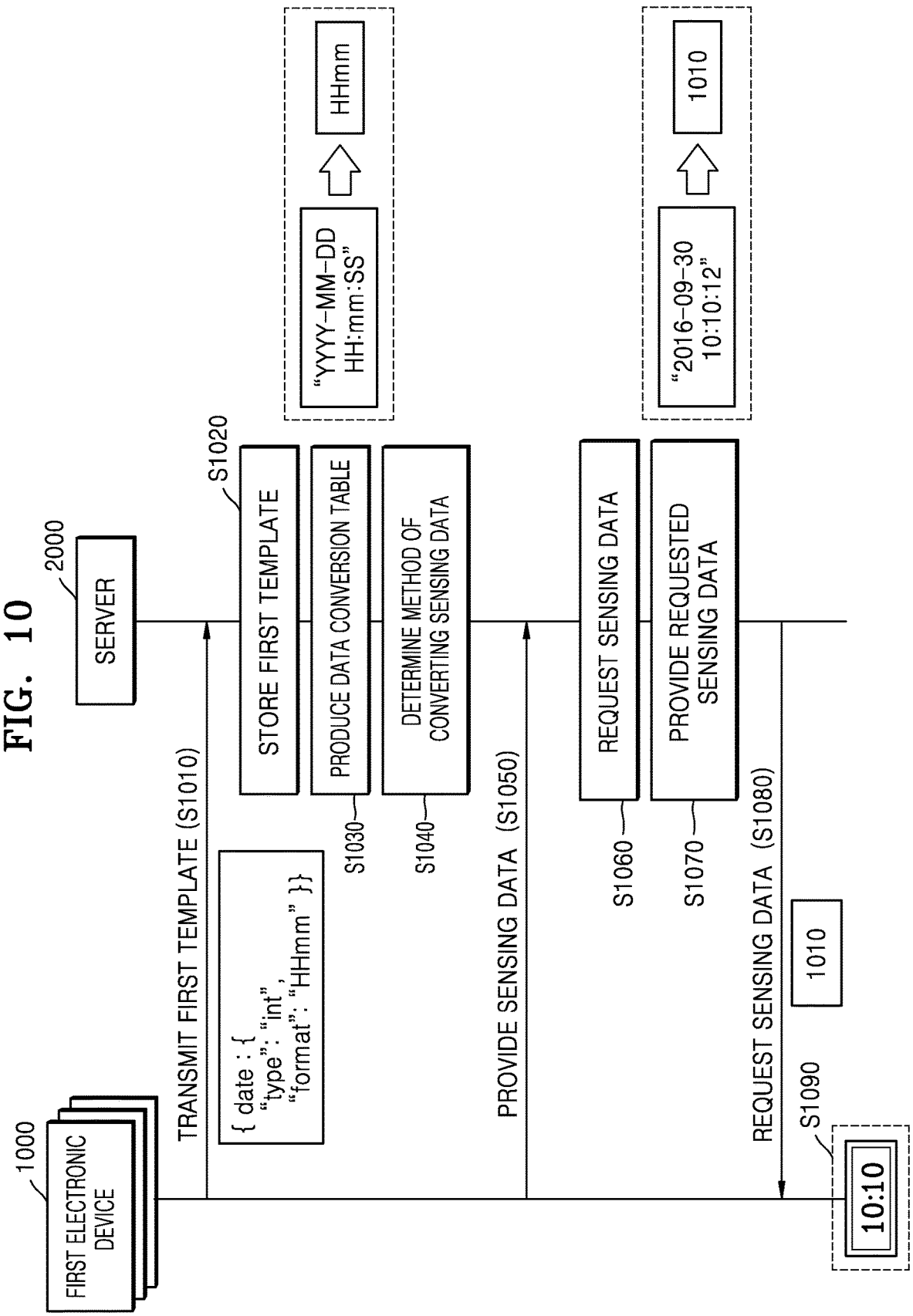
FIG. 10 illustrates an example in which a server converts sensing data by using a first template, according to an embodiment of the disclosure.

FIG. 10 illustrates an example in which a server converts sensing data by using a first template, according to an embodiment of the disclosure.

Referring to FIG. 10, at operation S1010, the server 2000 according to an embodiment may receive a first template from a first electronic device 1001.

The first template may include information representing that the first electronic device 1001 requires date data of the integer format and the form of required sensing data is "HHmm".

The server 2000 according to an embodiment may store the received first template at operation S1020, match information included in the first template (for example, the type of sensing data required by the first electronic device 1001, the format of the sensing data, and the form of the sensing data) with the first electronic device 1001, and may register a result of the matching in the first electronic device 1001. At this time, at operation S1030, the server 2000 may produce a data conversion table, based on the received first template. The data conversion table may be used to select sensing data required by the first electronic device 1001 from the pieces of sensing data stored in the DB of the server 2000. For example, the server 2000 may produce a view instance matched with the first electronic device 1001, based on the DB storing the pieces of sensing data received from the at least one second electronic device 1002. The view instance refers to a table created to restrictedly show only data of a type set by the view instance from among several types of data included in at least one table. Because the view instance is well known to one of ordinary skill in the art, a detailed description thereof will be omitted.

The server 2000 according to an embodiment may match the data conversion table produced based on the first template with the first electronic device 1001 and may register a result of the matching in the first electronic device 1001.

At operation S1040, the server 2000 according to an embodiment may determine a method of converting the sensing data into a format required by the first electronic device 1001, based on the first template. For example, as shown in FIG. 10, the server 2000 may store time data received from the at least one second electronic device 1002 in a form "YYYY-MM-DD HH:mm:ss", and the first electronic device 1001 may need time data in a form "HHmm". In this case, the server 2000 may check the form of the time data required by the first electronic device 1001 from the first template, and may determine a method of converting the form of time data stored in the DB of the server 2000 (for example, "YYYY-MM-DD HH:mm:ss") into the "HHmm" form required by the first electronic device 1001.

In response to a request for sensing data received from the first electronic device 1001 at operation S1050, the server 2000 according to an embodiment may provide the sensing data required by the first electronic device 1001 from among the pieces of sensing data stored in the DB of the server 2000, based on the data conversion table matched with the first electronic device 1001, at operation S1060.

For example, referring to FIG. 10, the server 2000 may select time data from among time data, temperature data, humidity data, and weather data stored in the DB of the server 2000, based on the data conversion table matched with the first electronic device 1001. The server 2000 may convert the time data according to the method of converting the sensing data matched with the first electronic device 1001. For example, referring to FIG. 10, the server 2000 may convert "2016-09-30 10:10:12", being the time data stored in the DB of the server 2000, to "1010", at operation S1070.

At operation S1080, the server 2000 according to an embodiment may provide the converted sensing data to the first electronic device 1001. At operation S1090, the first electronic device 1001 may perform a preset operation, based on the sensing data received from the server 2000. For example, referring to FIG. 10, the first electronic device 1001 may display the date data received from the server 2000 on the screen of the first electronic device 1001. However, the preset operation is not limited thereto, and may vary based on embodiments.

Figure 11:
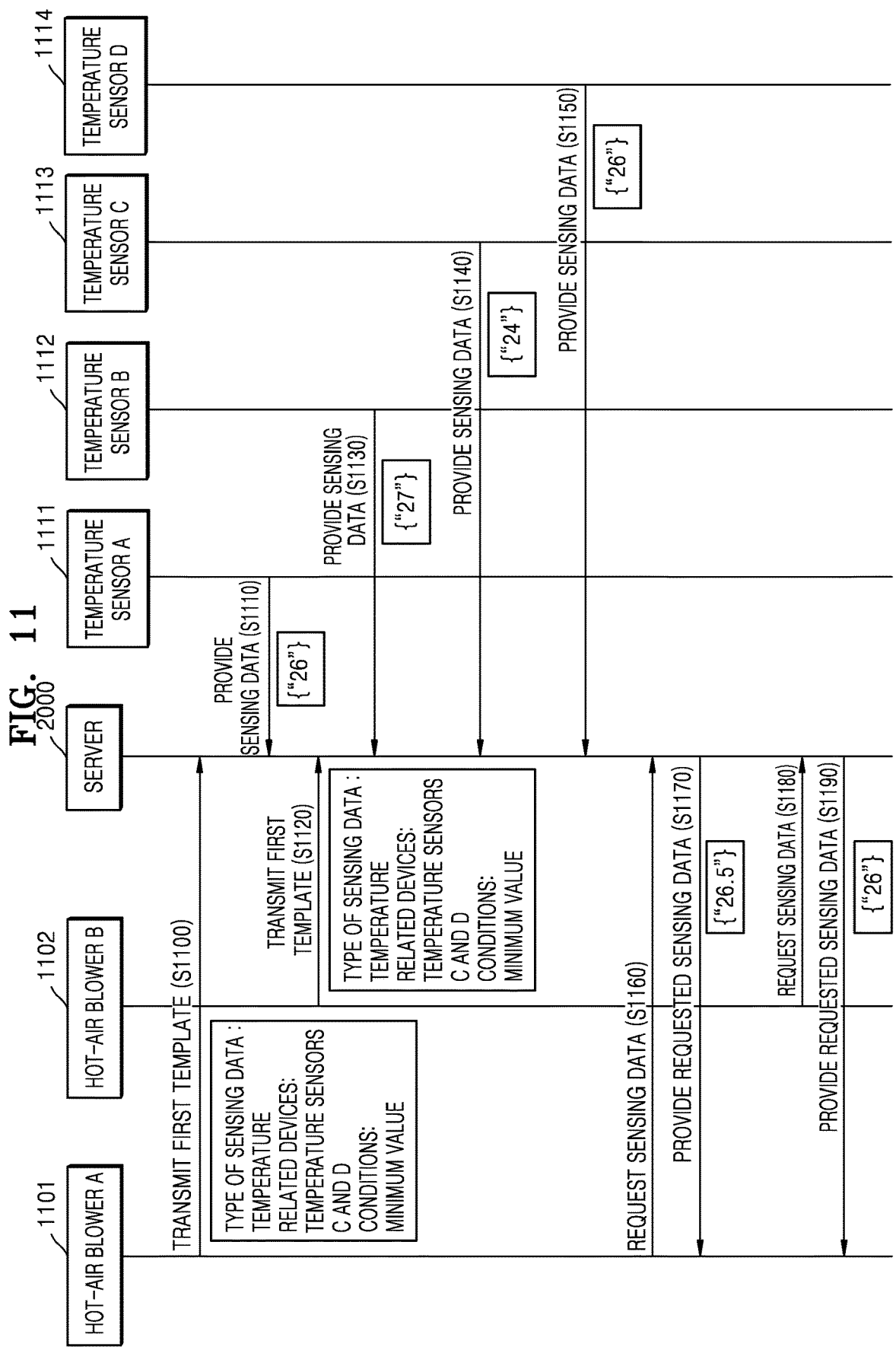
FIG. 11 illustrates an example in which a server provides different pieces of sensing data for different first electronic devices, according to an embodiment of the disclosure.

FIG. 11 illustrates an example in which a server provides different pieces of sensing data for different first electronic devices, according to an embodiment of the disclosure.

Referring to FIG. 11, a hot-air blower A 1101, a hot-air blower B 1102, temperature sensors A 1111 through D 1114, and a server 2000 may be connected to one another via a home network. The server 2000 may receive temperature data from the temperature sensors A 1111 through D 1114 and may provide the received temperature data to the hot-air blower A 1101 and the hot-air blower B 1102. In this case, the hot-air blower A 1101, the temperature sensor A 1111, and the temperature sensor B 1112 may be provided in a room, and the hot-air blower B 1102, the temperature sensor C 1113, and the temperature sensor D 1114 may be provided in a living room. Accordingly, whether the hot-air blower A 1101 operates may be determined based on the temperature data produced by the temperature sensor A 1111 and the temperature sensor B 1112, and whether the hot-air blower B 1102 operates may be determined based on the temperature data produced by the temperature sensor C 1113 and the temperature sensor D 1114.

Referring to FIG. 11, at operation S1100, the hot-air blower A 1101 may transmit, to the server 2000, a first template including information representing that the hot-air blower A 1101 requires pieces of temperature data produced by the temperature sensor A 1111 and the temperature sensor B 1112. The hot-air blower A 1101 may require a mean value of the pieces of temperature data produced by the temperature sensor A 1111 and the temperature sensor B 1112. At operation S1120, the hot-air blower B 1102 may transmit, to the server 2000, a first template including information representing that the hot-air blower B 1102 requires pieces of temperature data produced by the temperature sensor C 1113 and the temperature sensor D 1114. The hot-air blower B 1102 may require a minimum value from among the pieces of temperature data produced by the temperature sensor C 1113 and the temperature sensor D 1114.

At operations S1110, S1130, S1140, and S1150, the temperature sensors A 1111 through D 1114 may provide the pieces of temperature sensor respectively produced thereby to the server 2000.

In response to a request for sensing data received from the hot-air blower A 1101 at operation S1160, the server 2000 may convert the pieces of temperature data received from the temperature sensor A 1111 and the temperature sensor B 1112, based on the first template received from the hot-air blower A 1101. At operation S1170, the server 2000 may provide converted temperature data to the hot-air blower A 1101. For example, as shown in FIG. 11, when the temperature data received from the temperature sensor A 1111 is "26" and the temperature data received from the temperature sensor B 1112 is "27", the server 2000 may calculate a mean value ("26.5") of the two pieces of temperature data and provide the mean value ("26.5") to the hot-air blower A 1101.

In response to a request for sensing data received from the hot-air blower B 1102 at operation S1180, the server 2000 may convert the pieces of temperature data received from the temperature sensor C 1113 and the temperature sensor D 1114, based on the first template received from the hot-air blower B 1102. At operation S1190, the server 2000 may provide converted temperature data to the hot-air blower B 1102. For example, as shown in FIG. 11, when the temperature data received from the temperature sensor C 1113 is "24" and the temperature data received from the temperature sensor D 1114 is "26", the server 2000 may provide a minimum value ("24") from among the two pieces of temperature data to the hot-air blower B 1102. Accordingly, the server 2000 may easily provide the pieces of sensing data required by the hot-air blower A 1101 and the hot-air blower B 1102.

Figure 12:
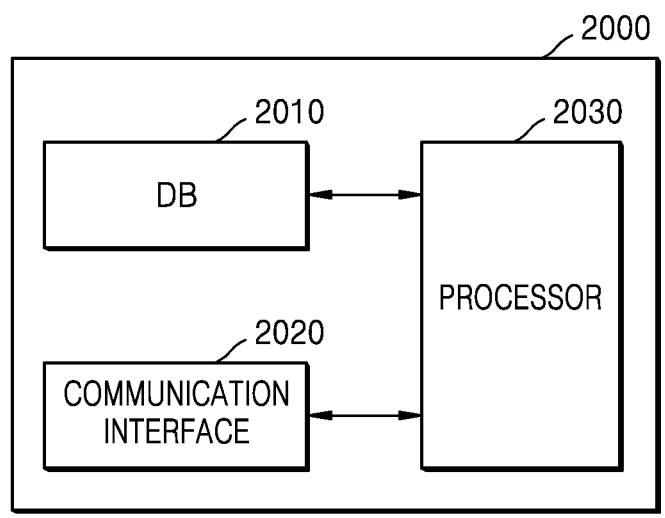
FIG. 12 is a block diagram of a server according to an embodiment of the disclosure.

FIG. 12 is a block diagram of a server according to an embodiment of the disclosure.

Referring to FIG. 12, the server 2000 according to an embodiment may include a DB 2010, a communication interface 2020, and a processor 2030. All of the components illustrated in FIG. 12 are not essential components of the server 2000. More or less components than those illustrated in FIG. 12 may constitute the server 2000.

The DB 2010 may store a program used by the processor 2030 to perform processing and control, and may also store data that is input to or output from the server 2000. The DB 2010 may store a first template received from at least one first electronic device 1001, and may store a data conversion table matched with the first electronic device 1001 and a method of converting sensing data. The DB 2010 may also store pieces of sensing data received from at least one second electronic device 1002. The DB 2010 may store at least one instruction that is executed by the processor 2030. For example, the DB 2010 may store at least one instruction of receiving, from the first electronic device 1001, a first template including information about the type of sensing data required by the first electronic device 1001 and the format of the sensing data, receiving a request for sensing data from the first electronic device 1001, selecting the requested sensing data from among the pieces of sensing data received from the at least one second electronic device 1002, based on the received first template, in response to the request, converting the selected sensing data by using the first template, and providing a response message including converted sensing data to the first electronic device 1001.

The DB 2010 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The communication interface 2020 may include at least one component that enables the server 2000 to communicate with at least one electronic device 1000 and another external device. The other external device may be a computing device, such as the server 2000, or a sensing device, and embodiments are not limited thereto.

The processor 2030 may control overall operations of the server 2000.

The processor 2030 executes the at least one instruction stored in the DB 2010 to receive from the first electronic device 1001 the first template including information about the type of sensing data required by the first electronic device 1001 and the format of the sensing data.

The first template may be information used by the server 100 to select the sensing data required by the first electronic device 1001 and process the selected sensing data to be suitable for the first electronic device 1001. For example, the first template may include information about at least one of the type of sensing data required by the first electronic device 1001, the format of the sensing data, and the form of a response message. The type of sensing data required by the first electronic device 1001 may be identified based on the capability of the first electronic device 1001. The format of the sensing data required by the first electronic device 1001 may be identified based on at least one of a communication environment between the first electronic device 1001 and the server 2000 and the capability of the first electronic device 1001. As the processor 2030 establishes communication with the first electronic device 1001, the processor 2030 may receive the first template from the first electronic device 1001.

The processor 2030 may receive a request for sensing data, from the first electronic device 1001. In response to the received request for sensing data, the processor 2030 may select the requested sensing data from among the pieces of sensing data received from the at least one second electronic device 1002, based on the received first template.

The processor 2030 converts the selected sensing data, based on the first template. The pieces of sensing data received from the at least one second electronic device 1002 may have different formats from a format of the sensing data required by the first electronic device 1001. In this case, the processor 2030 may convert the sensing data to a format required by the first electronic device 1001, based on the first template received from the first electronic device 1001.

The processor 2030 provides a response message including the converted sensing data to the first electronic device 1001. The processor 2030 may select the sensing data required by the first electronic device 1001 from among the pieces of sensing data received from the at least one second electronic device 1002. By converting the selected sensing data to the format required by the first electronic device 1001 and providing the converted sensing data to the first electronic device 1001, the processor 2030 may reduce a load required by the first electronic device 1001 to process the sensing data received from the processor 2030.

Figure 13:
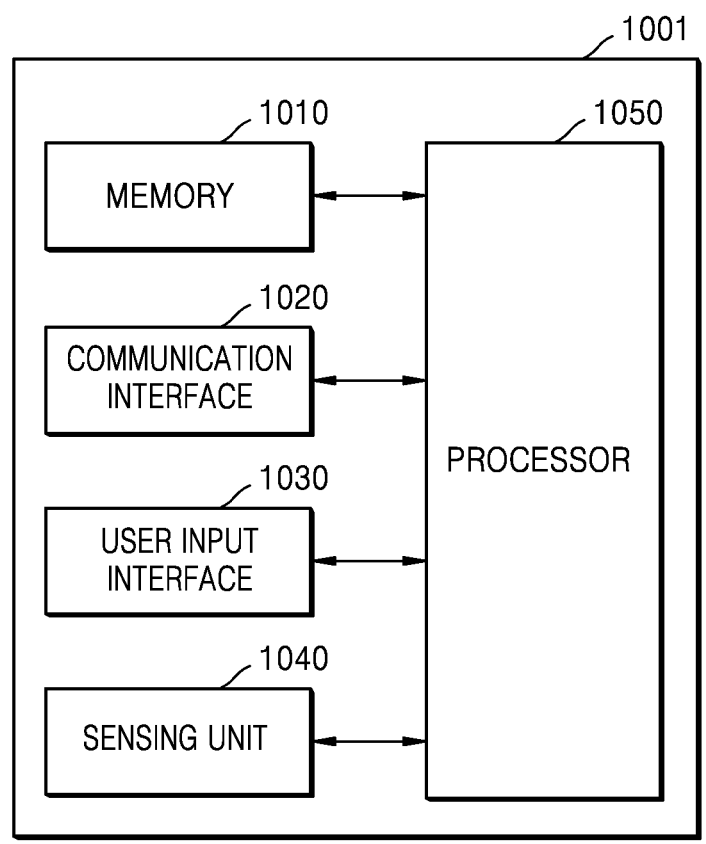
FIG. 13 is a block diagram of a first electronic device according to an embodiment of the disclosure.
Figure 14:
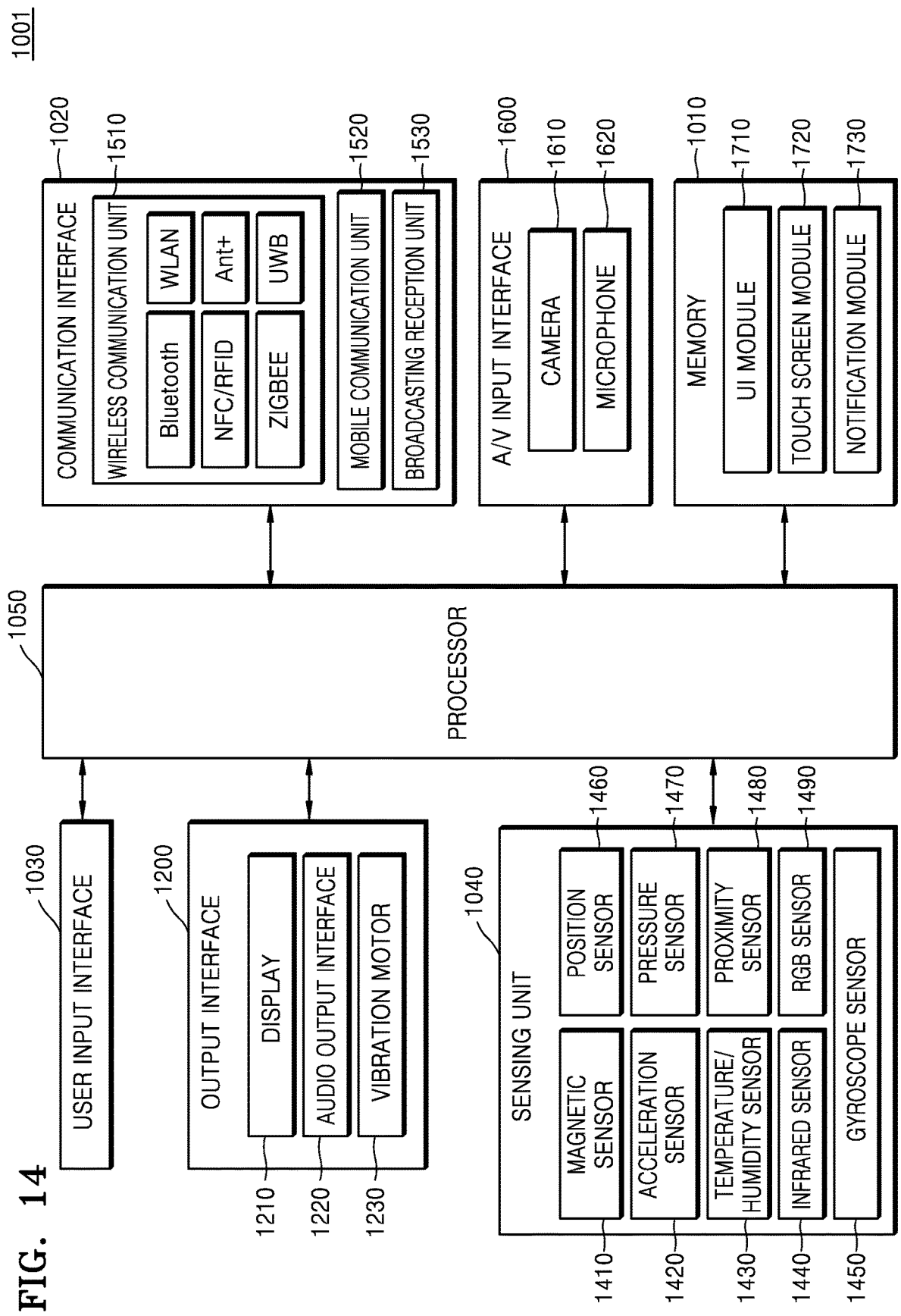
FIG. 14 is a block diagram of a first electronic device according to another embodiment of the disclosure.

FIGS. 13 and 14 are block diagrams of first electronic devices according to various embodiments of the disclosure.

Referring to FIG. 13, a first electronic device 1001 according to an embodiment may include a memory 1010, a communication interface 1020, a user input interface 1030, a sensing unit 1040, and a processor 1050. All of the components illustrated in FIG. 13 are not essential components of the first electronic device 1001. More or less components than those illustrated in FIG. 13 may constitute the first electronic device 1001.

Referring to FIG. 14, the first electronic device 1001 according to an embodiment may further include an output interface 1200 and an audio/video (A/V) input interface 1600 in addition to the memory 1010, the communication interface 1020, the user input interface 1030, the sensing unit 1040, and the processor 1050.

The memory 1010 may store a program used by the processor 1050 to perform processing and control, and may also store data that is input to or output from the first electronic device 1001.

The memory 1010 may include at least one type of storage medium selected from among a flash memory type, a hard disk type, a multimedia card micro type, a card type memory (for example, a SD or XD memory), a RAM, a SRAM, a ROM, an EEPROM, a PROM, magnetic memory, a magnetic disk, and an optical disk.

The programs stored in the memory 1010 may be classified into a plurality of modules according to their functions, for example, a user interface (UI) module 1710, a touch screen module 1720, and a notification module 1730.

The UI module 1710 may provide a UI, graphical user interface (GUI), or the like that is specialized for each application and interoperates with the first electronic device 1001. The touch screen module 1720 may detect a touch gesture on a touch screen of a user and transmit information regarding the touch gesture to the processor 1050. The touch screen module 1720 according to an embodiment may recognize and analyze a touch code. The touch screen module 1720 may be configured by separate hardware including a controller.

The notification module 1730 may generate a signal for notifying that an event has been generated in the first electronic device 1001. Examples of the event generated in the first electronic device 1001 may include call signal receiving, message receiving, a key signal input, schedule notification, and the like. The notification module 1730 may output a notification signal in the form of a video signal via a display 1210, in the form of an audio signal via an audio output interface 1220, or in the form of a vibration signal via a vibration motor 1230.

The communication interface 1020 may include at least one component that enables the first electronic device 1001 to communicate with another device (not shown) and the server 2000. The other device may be a computing device, such as the first electronic device 1001, or a sensing device, and embodiments are not limited thereto. For example, the communication interface 1020 of FIG. 13 may include a short-range wireless communication unit 1510, a mobile communication unit 1520, and a broadcasting reception unit 1530 of FIG. 14.

The short-range wireless communication unit 1510 may include, but is not limited to, a Bluetooth communicator, a bluetooth low energy (BLE) communicator, a near field communication (NFC) unit, a wireless local area network (WLAN) (e.g., Wi-Fi) communicator, a ZigBee communicator, an infrared data association (IrDA) communicator, a Wi-Fi direct (WFD) communicator, an ultra wideband (UWB) communicator, an Ant+ communicator, and the like.

The mobile communication unit 1520 may exchange a wireless signal with at least one selected from a base station, an external terminal, and a server on a mobile communication network. Here, examples of the wireless signal may include a voice call signal, a video call signal, and various types of data according to text/multimedia messages transmission.

The broadcasting reception unit 1530 receives a broadcasting signal and/or broadcasting-related information from an external source via a broadcasting channel. The broadcasting channel may be a satellite channel, a ground wave channel, or the like. According to embodiments, the first electronic device 1001 may not include the broadcasting reception unit 1530.

The communication interface 1020 may transmit or receive, to or from the other device and the server 2000, information necessary for executing operations, performed by the first electronic device 1001, of requesting the server 2000 for sensing data and receiving a response message including the requested sensing data from the server 2000.

The user input interface 1030 denotes a unit via which a user inputs data for controlling the first electronic device 1001. For example, the user input interface 1030 may be, but is not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

The user input interface 1030 may receive a user input of requesting the server 2000 for sensing data.

The sensing unit 1040 may sense a state of the first electronic device 1001 or a state of the surrounding of the first electronic device 1001 and may transmit information corresponding to the sensed state to the processor 1050. In order to transmit sensing data produced by the first electronic device 1001 to the server 2000, the sensing unit 1040 may sense the state of the surrounding of the first electronic device 1001 and may transmit information corresponding to the sensed state to the processor 1050 such that the processor 1050 may process the received information.

The sensing unit 1040 includes a magnetic sensor 1410, an acceleration sensor 1420, a temperature/humidity sensor 1430, an infrared sensor 1440, a gyroscope sensor 1450, a position sensor 1460, a pressure sensor 1470, a proximity sensor 1480 and RGB sensor 1490.

The processor 1050 may control overall operations of the first electronic device 1001.

The processor 1050 executes at least one instruction stored in the memory 1010 to transmit, to the server 2000, a first template including information about the type of sensing data required by the first electronic device 1001 and the format of the sensing data. As the processor 1050 establishes communication with the server 2000, the processor 1050 may transmit the first template to the server 2000. For example, when the processor 1050 initially establishes communication with the server 2000, the first electronic device 1001 may transmit the first template to the server 2000 while registering the first template in the server 2000. The server 2000 may store the received first template, and, in response to a request made to the first electronic device 1001 for sensing data, may provide converted sensing data obtained based on the stored first template. Accordingly, after the first template is transmitted to the server 2000 as the processor 1050 establishes communication with the server 2000, the processor 1050 does not need to repeatedly transmit the first template.

The processor 1050 according to an embodiment may request the server 2000 for sensing data. For example, the processor 1010 may transmit to the server 2000 a message requesting the sensing data.

The processor 1050 according to an embodiment may receive the converted sensing data obtained based on the first template from the server 2000. For example, when the first electronic device 1001 is a humidifier, the processor 1050 may receive humidity data from among various pieces of sensing data stored in the server 2000, in a binary number format, based on the first template. Accordingly, the processor 1050 may reduce the size of the received sensing data by previously providing information about the type of sensing data required by the first electronic device 1001 to the server 2000. In addition, the processor 1050 may receive sensing data having a format easily processable by the processor 1050, by previously providing the format of the sensing data required by the first electronic device 1001 to the server 2000.

The processor 1050 according to an embodiment may perform a preset operation, based on the received sensing data. The first electronic device 1001 according to an embodiment may compare the received sensing data with a preset threshold and may perform a predetermined operation according to a result of the comparison. For example, the first electronic device 1001 may control an alarm to be displayed when the received sensing data is less than the preset threshold or the first electronic device 1001 to be automatically turned on when the received sensing data is greater than the preset threshold.

The output interface 1200 may output an audio signal, a video signal, or a vibration signal, and may include the display 1210, the audio output interface 1220, and the vibration motor 1230.

The display 1210 displays information that is processed by the first electronic device 1001. For example, the display 1210 may request a response message for a voice input of the user and display a UI for executing an operation related to the response message.

The audio output interface 1220 outputs audio data that is received from the communication interface 1020 or stored in the memory 1010. The audio output interface 1220 also outputs an audio signal (for example, a call signal receiving sound, a message receiving sound, or a notification sound) related with a function of the first electronic device 1001.

The A/V input interface 1600 inputs an audio signal or a video signal, and may include a camera 1610 and a microphone 1620. The camera 1610 may acquire an image frame, such as a still image or a moving picture, via an image sensor in a video call mode or a photography mode. An image captured via the image sensor may be processed by the processor 1050 or a separate image processor (not shown). The image captured by the camera 1610 may be utilized as context information of the user.

The microphone 1620 receives an external audio signal and converts the external audio signal into electrical audio data. For example, the microphone 1620 may receive an audio signal from an external device or a user. The microphone 1620 may receive a voice input of the user. The microphone 1620 may use various noise removal algorithms in order to remove noise that is generated while receiving the external audio signal.

Embodiments can be embodied as a storage medium including instruction codes executable by a computer such as a program module executed by the computer. A computer readable medium can be any available medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes any information transmission medium.

The terminology "unit" used herein may be a hardware component such as a processor or a circuit, and/or a software component that is executed by a hardware component such as a processor.

Although the embodiments of the disclosure have been disclosed for illustrative purposes, one of ordinary skill in the art will appreciate that diverse variations and modifications are possible, without departing from the spirit and scope of the disclosure. Thus, the above embodiments should be understood not to be restrictive but to be illustrative, in all aspects. For example, respective elements described in an integrated form may be dividedly used, and the divided elements may be used in a state of being combined.

The embodiments should be considered in descriptive sense only and not for purposes of limitation. Descriptions of features or aspects within each embodiment should typically be considered as available for other similar features or aspects in other embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A server for providing sensing data to at least one electronic device, the server comprising:
   a communication interface configured to communicate with the at least one electronic device;
   a memory storing at least one instruction; and
   at least one processor configured to execute the at least one instruction stored in the memory,
   wherein the at least one processor executes the at least one instruction to:
   receive, from a first electronic device, a first template including information about a type of sensing data required by the first electronic device and a format of the sensing data,
   receive a request for the sensing data from the first electronic device,
   select the requested sensing data from among pieces of sensing data received from at least one second electronic device, based on the received first template, in response to the request,
   convert the selected sensing data, based on the first template, to obtain converted sensing data, and
   provide a response message including the converted sensing data to the first electronic device in a communication environment between the first electronic device and the server,
   wherein the format of sensing data of the first template is determined by the first electronic device based on the communication environment, and
   wherein the sensing data is converted based on the determined format of the sensing data of the first template.

2. The server of claim 1, wherein the at least one processor is further configured to execute the at least one instruction to receive, as the communication with the first electronic device is established, the first template from the first electronic device.

3. The server of claim 1,
   wherein the first template further includes information about a form of the response message, and
   wherein the at least one processor is further configured to execute the at least one instruction to produce the response message that is to be provided to the first electronic device, based on the information about the form of the response message included in the first template.

4. The server of claim 1, wherein the at least one processor is further configured to execute the at least one instruction to:
   receive, from the at least one second electronic device, a second template including the information about a type of sensing data required by the at least one second electronic device and a format of the sensing data, and
   produce a data conversion table by using the first template and the second template.

5. The server of claim 1, wherein the at least one processor is further configured to execute the at least one instruction to match the information about the type of sensing data required by the first electronic device and the format of the sensing data, which is included in the first template, with the first electronic device and register the first electronic device based on a result of the matching.

6. The server of claim 1, wherein the type of sensing data required by the first electronic device is identified based on a capability of the first electronic device.

7. The server of claim 1, wherein the format of the sensing data is identified based on a capability of the first electronic device.

8. The server of claim 1, wherein the at least one processor is further configured to execute the at least one instruction to:
when at least one of the type of sensing data required by the first electronic device and the format of the sensing data is changed, receive information about the change, and
update the first template, based on the received information.

9. A method, performed by a server, of providing sensing data to at least one electronic device, the method comprising:
receiving, from a first electronic device, a first template including information about a type of sensing data required by the first electronic device and a format of the sensing data;
receiving a request for the sensing data from the first electronic device;
selecting the requested sensing data from among pieces of sensing data received from at least one second electronic device, based on the received first template, in response to the request;
converting the selected sensing data, based on the first template, to obtain converted sensing data; and
providing a response message including the converted sensing data to the first electronic device in a communication environment between the first electronic device and the server,
wherein the format of sensing data of the first template is determined by the first electronic device based on the communication environment, and
wherein the sensing data is converted based on the determined format of the sensing data of the first template.

10. The method of claim 9, wherein the receiving of the first template from the first electronic device comprises, as the server establishes communication with the first electronic device, receiving the first template from the first electronic device.

11. The server of claim 9,
wherein the first template further includes information about a form of the response message, and
wherein the providing of the response message to the first electronic device comprises producing the response message that is to be provided to the first electronic device, based on the information about the form of the response message included in the first template.

12. The method of claim 9, wherein the receiving of the first template from the first electronic device comprises:
receiving, from the at least one second electronic device, a second template including the information about a type of sensing data required by the at least one second electronic device and a format of the sensing data; and
producing a data conversion table by using the first template and the second template.

13. The method of claim 9, further comprising matching the information about the type of sensing data required by the first electronic device and the format of the sensing data, which is included in the first template, with the first electronic device and registering the first electronic device based on a result of the matching.

14. The method of claim 9, wherein the type of sensing data required by the first electronic device is identified based on a capability of the first electronic device.

15. The method of claim 9, wherein the format of sensing data is identified based on a capability of the first electronic device.

16. The method of claim 9, further comprising:
when at least one of the type of sensing data required by the first electronic device and the format of the sensing data is changed, receiving information about the change; and
updating the first template, based on the received information.

17. The method of claim 9, wherein the converted sensing data received from the at least one second electronic device is aggregated into a single value for testing in comparison to a threshold.

18. A non-transitory computer-readable recording medium having recorded thereon a computer program, which, when executed by a computer, causes the computer to:
receive, from a first electronic device, a first template including information about a type of sensing data required by the first electronic device and a format of the sensing data;
receive a request for the sensing data from the first electronic device;
select the requested sensing data from among pieces of sensing data received from at least one second electronic device, based on the received first template, in response to the request;
convert the selected sensing data, based on the first template, to obtain converted sensing data; and
provide a response message including the converted sensing data to the first electronic device in a communication environment between the first electronic device and the server,
wherein the format of sensing data of the first template is determined by the first electronic device based on the communication environment, and
wherein the sensing data is converted based on the determined format of the sensing data of the first template.

* * * * *